US008503457B2

(12) United States Patent
Kumar et al.

(10) Patent No.: US 8,503,457 B2
(45) Date of Patent: *Aug. 6, 2013

(54) METHOD OF FORMING A DIGITAL OR ANALOG MULTIPLEXING DATA FRAME

(75) Inventors: Addepalli Sateesh Kumar, Menlo Park, CA (US); Chandrasekaran Nageswara Gupta, San Jose, CA (US); Tushar Ramanlal Shah, Milpitas, CA (US); Debaditya Mukherjee, Fremont, CA (US); Thomas Yat Chung Woo, Red Bank, NJ (US); Khalid Sheikh, Fremont, CA (US); Jai Prakash Agrawal, San Jose, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 895 days.

This patent is subject to a terminal disclaimer.

(21) Appl. No.: 12/014,685

(22) Filed: Jan. 15, 2008

(65) Prior Publication Data

US 2008/0130689 A1 Jun. 5, 2008

Related U.S. Application Data

(63) Continuation of application No. 10/023,974, filed on Dec. 17, 2001, now Pat. No. 7,333,512.

(60) Provisional application No. 60/256,540, filed on Dec. 18, 2000, provisional application No. 60/276,610, filed on Mar. 16, 2001.

(51) Int. Cl.
*H04L 12/28* (2006.01)

(52) U.S. Cl.
USPC .................. 370/395.41; 370/474; 370/353

(58) Field of Classification Search
USPC .............. 370/389, 395.21, 395.41, 471, 468, 370/474, 493, 353, 321, 337, 347, 442
See application file for complete search history.

(56) References Cited

U.S. PATENT DOCUMENTS

| 4,549,291 | A | 10/1985 | Renoulin et al. |
| 5,305,322 | A | 4/1994 | Kabaya |

(Continued)

FOREIGN PATENT DOCUMENTS

| JP | 2000-101585 | 4/2000 |
| JP | 2000-101620 | 4/2000 |
| JP | 2000-165391 | 6/2000 |

OTHER PUBLICATIONS

Non-Final Office Action, dated Jan. 13, 2006, for U.S. Appl. No. 10/023,958, filed Dec. 17, 2001, 6 pages.

(Continued)

*Primary Examiner* — Brenda H Pham
(74) *Attorney, Agent, or Firm* — Sterne, Kessler, Goldstein & Fox PLLC

(57) ABSTRACT

To more fully utilize the available bandwidth of a network link, network nodes in accordance with the present invention allow TDM data to be combined with packet data. A Packet/TDM cross connect switch, having both a TDM switch and a packet switch, is used in these embodiments. Data packets are transformed into TDM packet columns. The TDM packet columns are combined with standard TDM data columns in the payload of a TDM data frame. Data packets may be sorted based on a priority scheme, in which high priority data packets are given precedence over lower priority data. However, both high priority and low priority may be combined in a TDM packet column.

28 Claims, 16 Drawing Sheets

(56) References Cited

U.S. PATENT DOCUMENTS

| | | | |
|---|---|---|---|
| 5,682,256 A | 10/1997 | Motley et al. |
| 5,774,698 A | 6/1998 | Olnowich |
| 5,867,502 A | 2/1999 | Chang |
| 5,920,571 A | 7/1999 | Houck et al. |
| 5,936,949 A | 8/1999 | Pasternak et al. |
| 6,091,967 A | 7/2000 | Kruys et al. |
| 6,122,083 A | 9/2000 | Ohta et al. |
| 6,122,281 A | 9/2000 | Donovan et al. |
| 6,169,749 B1 | 1/2001 | Dove et al. |
| 6,262,973 B1 | 7/2001 | Shiraishi et al. |
| 6,262,994 B1 | 7/2001 | Dirschedl et al. |
| 6,272,128 B1 | 8/2001 | Pierson |
| 6,333,916 B1 | 12/2001 | Hamada et al. |
| 6,359,877 B1 | 3/2002 | Rathonyi et al. |
| 6,366,584 B1 | 4/2002 | Gulliford et al. |
| 6,389,009 B1 | 5/2002 | Pickett |
| 6,389,036 B1 | 5/2002 | Stewart et al. |
| 6,421,720 B2 | 7/2002 | Fitzgerald |
| 6,452,964 B1 | 9/2002 | Yoshida |
| 6,529,303 B1 | 3/2003 | Rowan et al. |
| 6,560,213 B1 | 5/2003 | Izadpanah et al. |
| 6,614,781 B1 | 9/2003 | Elliott et al. |
| 6,621,804 B1 | 9/2003 | Holtzman et al. |
| 6,628,956 B2 | 9/2003 | Bark et al. |
| 6,631,130 B1 | 10/2003 | Roy et al. |
| 6,633,566 B1 | 10/2003 | Pierson |
| 6,640,248 B1 | 10/2003 | Jorgensen |
| 6,646,983 B1 | 11/2003 | Roy et al. |
| 6,658,008 B1 | 12/2003 | Hosein |
| 6,658,620 B1 | 12/2003 | Berger et al. |
| 6,674,750 B1 | 1/2004 | Castellano |
| 6,681,083 B1 | 1/2004 | Koonen |
| 6,687,247 B1 | 2/2004 | Wilford et al. |
| 6,731,649 B1 | 5/2004 | Silverman |
| 6,731,832 B2 | 5/2004 | Alvarez et al. |
| 6,738,949 B2 | 5/2004 | Senda et al. |
| 6,744,768 B2 | 6/2004 | Vikberg et al. |
| 6,762,992 B1 | 7/2004 | Lemieux |
| 6,778,550 B1 | 8/2004 | Blahut |
| 6,788,666 B1 | 9/2004 | Linebarger et al. |
| 6,831,902 B1 | 12/2004 | Dougherty et al. |
| 6,850,660 B2 | 2/2005 | Notani |
| 6,934,749 B1 | 8/2005 | Black et al. |
| 7,103,063 B2 | 9/2006 | Fang |
| 7,165,102 B2 | 1/2007 | Shah et al. |
| 7,173,927 B2 | 2/2007 | Kumar et al. |
| 7,327,758 B2 * | 2/2008 | Kumar et al. | 370/471 |
| 7,333,512 B2 | 2/2008 | Kumar et al. | 370/473 |
| 2001/0044835 A1 | 11/2001 | Schober et al. |
| 2002/0028679 A1 | 3/2002 | Edwards et al. |
| 2002/0075868 A1 | 6/2002 | Gupta et al. |
| 2002/0075869 A1 | 6/2002 | Shah et al. |
| 2002/0075906 A1 | 6/2002 | Cole et al. |
| 2002/0085543 A1 | 7/2002 | O'Connor |
| 2002/0181475 A1 | 12/2002 | Dove et al. |
| 2003/0108172 A1 | 6/2003 | Petty et al. |

OTHER PUBLICATIONS

Non-Final Office Action, dated Oct. 18, 2005, for U.S. Appl. No. 10/023,972, filed Dec. 17, 2001, 13 pages.

Final Office Action, dated Apr. 20, 2006, for U.S. Appl. No. 10/023,972, filed Dec. 17, 2001, 13 pages.

* cited by examiner

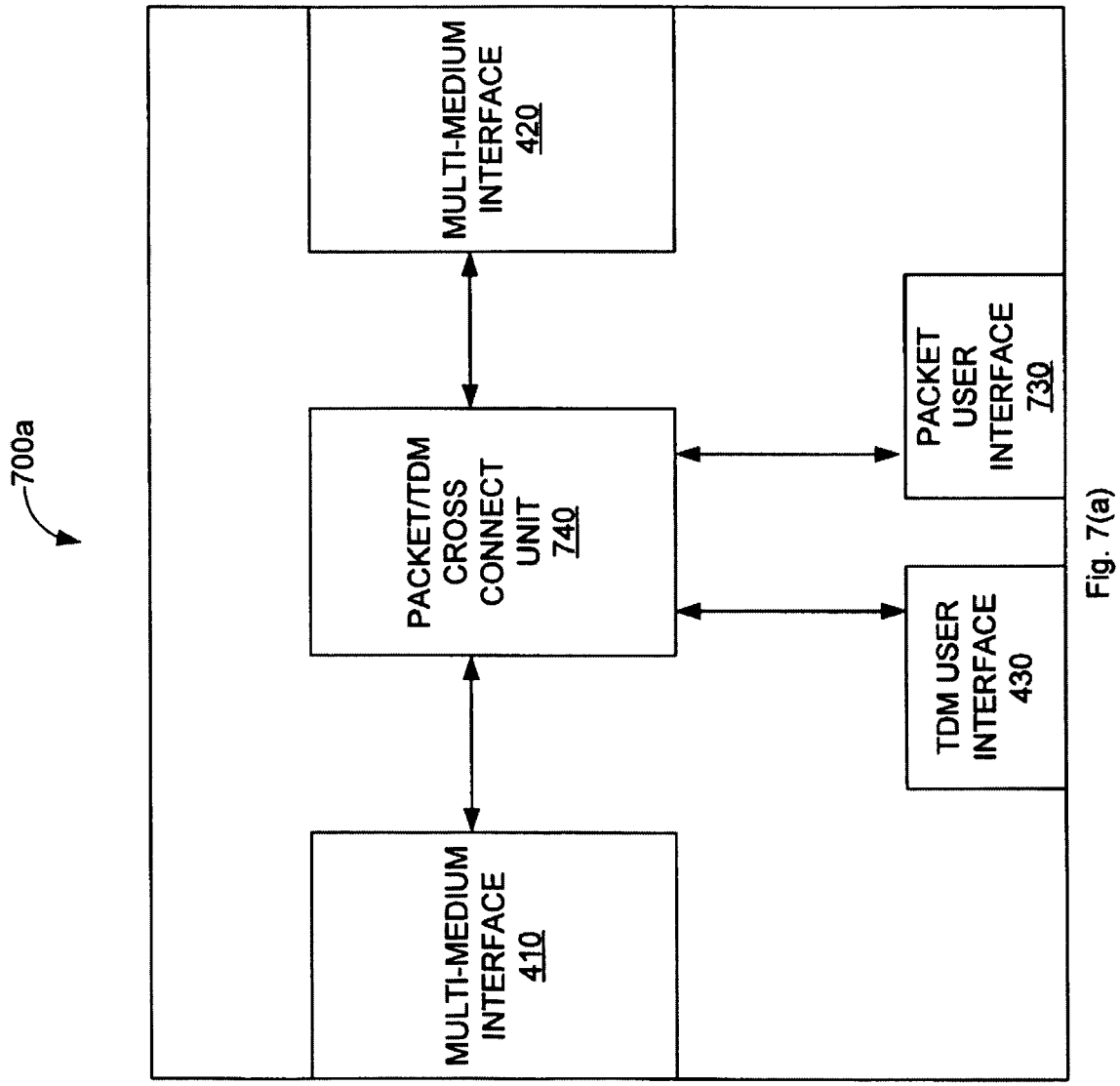

US 8,503,457 B2

METHOD OF FORMING A DIGITAL OR ANALOG MULTIPLEXING DATA FRAME

RELATED APPLICATIONS

The present application is a continuation of U.S. Non-Provisional application Ser. No. 10/023,974, filed Dec. 17, 2001, now U.S. Pat. No. 7,333,512 issued on Feb. 19, 2008, which claims benefit to U.S. Provisional Application No. 60/256,540, filed Dec. 18, 2000, and U.S. Provisional Application No. 60/276,610, filed Mar. 16, 2001, all of which is incorporated by reference herein its entirety.

The present application is also a continuation-in-part of U.S. Provisional Patent Application Ser. No. 60/276,610, by Tushar Ramanlal Shah, Addepalli Sateesh Kumar, and Chandrasekaran Nageswara Gupta, entitled "Architecture Optimized to Support Fixed-Rate Synchronous Native TDM Data (SONET) and Bursty Asynchronous Data Transmission over Metropolitan Area Network Using Any Physical Medium Including But Not Limited to Optical or Wireless Medium" filed Mar. 16, 2001, which is incorporated herein by reference.

This application also relates to U.S. application Ser. No. 10/023,633 by Gupta et al., entitled "Network Node with Multi-Medium Interfaces owned by the assignee of this application and incorporated herein by reference.

This application also relates to application Ser. No. 10/023,963 now U.S. Pat. No. 7,173,927, by Kumar et al., entitled "Hybrid Network to Carry Synchronous and Asynchronous Traffic over Symmetric and Asymmetric Links", owned by the assignee of this application and incorporated herein by reference.

This application also relates to U.S. application Ser. No. 10/023,623, now U.S. Pat. No. 7,165,102, by Shah et al., entitled "Adaptive Link Quality Management for Wireless Medium", owned by the assignee of this application and incorporated herein by reference.

This application also relates to U.S. application Ser. No. 10/023,972 by Shah et al., entitled "Integration of Network, Data Link, and Physical Layer to Adapt Network Traffic", owned by the assignee of this application and incorporated herein by reference.

This application also relates to U.S. application Ser. No. 10/023,958, now U.S. Pat. No. 7,327,758, by Kumar et al., entitled "Method of Generating, Transmitting, Receiving and Recovering Synchronous Frames with Non-standard Speeds", owned by the assignee of this application and incorporated herein by reference.

FIELD OF THE INVENTION

The present invention relates to data networking. More specifically, the present invention relates to network nodes using multiple network mediums in metro area networking.

BACKGROUND OF THE INVENTION

The development of high-speed networking has traditionally been driven by the telecommunications industry and the computer industry. However the data traffic patterns for the telecommunications industry is very different from the data traffic pattern for the computer industry. Specifically, the telecommunication industry primarily has been concerned with providing data networks for carrying voice data in telephone calls. Voice data in general requires a constant bandwidth connection. Thus, the telecommunication networks were traditionally designed to provide constant bandwidth using time division multiplexing (TDM) techniques. In time division multiplexing each data stream is assigned a specific amount of bandwidth within the TDM network to transfer data. For example, synchronous optical network (SONET/SDH/PDH) is a widely used networking scheme in the telecommunications industry. SONET/SDH/PDH is a connection oriented scheme, in which each channel is given a fixed amount of bandwidth based on a standardized increment related to the amount of data needed to provide a standard voice phone call. Furthermore, TDM networks for voice-based applications are typically designed to support peak usage bandwidth requirements. Thus, under normal circumstances (i.e. non-peak usage) TDM networks are under utilized and have spare capacity.

FIG. 1 shows a typical TDM based metro area network (MAN) 100 having various network nodes 110, 120, 130, 140, 150, and 160 connected with fiber optic links 112, 121, 123, 132, 134, 143, 145, 154, 165, 156, 116, and 161. Specifically, network node 110 is coupled to network node 120 by fiber optic links 121 and 112. Fiber optic link 112 carries data from network node 110 to network node 120. Fiber optic link 121 carries data from network node 120 to network node 110. In general fiber optic link 1xy carries data from network node 1x0 to network node 1y0, where x and y are in the range 1-6 inclusive. Typically, each network node provides TDM service to large number of users, who are coupled to the network node using industry standard TDM interfaces. Fiber optic links are used because of the high bandwidth, low latency, reliability, and consistency provided by fiber optic links as compared to other network medium. Metro area network 100 uses a dual ring topology. The dual ring topology provides redundancy in case one of the optical links becomes unusable. For example, if optical fiber link 123 were to become unusable, data from network node 120 could still reach network node 130 using fiber optic links 121, 116, 165, 154, and 143.

FIG. 2 is a simplified block diagram of a conventional network node 200 having a first optical interface 210, a second optical interface 220, a TDM user interface 230, and a cross connect unit 240. Optical interfaces 210 and 220 are configured to transmit and receive data with other network nodes. Specifically, each optical interface includes a fiber optic port for a transmit fiber optics link (not shown) and a receive fiber optics link (not shown). For example, if network node 200 were used in place of network node 120 (FIG. 1) optical interface 210 would be coupled to fiber optic links 112 and 121 and optical interface 220 would be coupled to fiber optics link 123 and 132. TDM user interface 230 provides an access point for receiving and transmitting data to user equipment or networks. Various embodiments of network node 200 may provide TDM user interfaces with different network medium and protocols. Data from TDM user interface 230 is transferred to optical interfaces 210 and/or 220 through cross connect unit 240. Conversely, data destined for the users of network node 200 are received by optical interfaces 210 and/or 220 and transferred to TDM user interface 230 through cross connect unit 240.

TDM networks transfer data in TDM frames like SONET, SDH, and PDH. SONET refers to Synchronous Optical Network. SDH refers to Synchronous Digital Hierarchy. PDH refers to Plesiochronous Digital Hierarchy. FIG. 3 shows an example of a TDM frame 300, which is made of header columns and payload columns. TDM frame 300 could be for example a SONET frame, a SDH frame or a PDH frame. TDM Frame 300 includes a header section 310 and payload columns such as columns 321, 325, and 327. Header section 310 contains information regarding TDM frame 300 such as the source and destination of TDM frame 300. The payload columns contain payload data to be transported. Payload data is also referred to as the transport payload. In general TDM frame 300 has a fixed number of data columns. For example, a SONET STS1 frame consists of 90 columns of 9 bytes each. The first three columns form header section 310 leaving 87 payload columns (and a byte space of 87×9 bytes) for payload. An STSn frame contains first 3×n columns of header and 87×n columns for payload. Transport payload size varies. Thus sometimes the transport payload does not occupy all of the 87n payload columns. Other times, the transport payload may spill over to a part of the payload columns of the following TDM frame. A transport payload may start at any byte in the payload columns of the TDM frame. The transport payload is packed into the payload columns in a column-wise manner and is provisioned in an integral number of columns in the TDM frame. If the TDM frame is not provisioned to full capacity, the unprovisioned columns, i.e. unused columns, are filled with dummy (non-data) characters. Thus, some of the total bandwidth of a TDM network may be unused during normal operation.

The computer industry primarily is concerned with transferring computer data over a network. In general, computer data is "bursty", i.e., computer data traffic requires high bandwidth for some periods of times and little or no bandwidth at other times. To take advantage of high-speed networks, the computer industry adopted a packet-based approach to networking. Generally, a data stream is packetized into multiple data packets. The data packets contain identifying information so that the packets can be reassembled into the original data stream. Packet based networking allows multiple data streams to share a network and obtain better bandwidth utilization for bursty data than the TDM approach used in telecommunication networks.

With the growing use of computers and computer networks, in particular the Internet, the amount of computer data traffic is increasing very rapidly. In contrast, voice data traffic is growing at a slower pace. Furthermore, some voice data is being transformed into packet data using protocols such as Voice over Internet Protocol (VoIP). To capitalize on the growing use of packetized data, techniques and equipment need to be developed to allow efficient transport of packetized data on TDM networks having excess capacity.

Additionally, deployment limitations of typical TDM networks prevent wide spread use of TDM networks for TDM and Computer network application. As explained above, the telecommunication/computer networks make use of fiber optic links for increased bandwidth and reliability. However, installation of fiber optic cables particularly in a metropolitan area is very time consuming. For example to add fiber optic links to a new network node, trenching permits and easements must be obtained prior to installing and configuring the optical links. Including the time required to obtain permits and easements, the time to actually install and configure a fiber optic link to a new network node could be as long as 18 months. Given all the regulatory challenges and the cost of deploying fiber, fiber is deployed to only 8-10% of buildings in dense urban areas like Manhattan, N.Y. and less than 1% in dense suburban areas like San Jose, Calif. The long delay in obtaining connections to a network node cannot be tolerated in the fast paced computer industry. Hence, there is a need for a method and system to combine packet based data with TDM data and to overcome the deployment limitation of fiber optic based networks.

SUMMARY

Accordingly, a network node in accordance with some embodiment of the present invention provides wireless interfaces with the quality and reliability of fiber optic interfaces. Furthermore, network nodes in accordance with some embodiments of the present invention can combine data packets within TDM data frames to provide support for both TDM data and packet data.

For example, in one embodiment of the present invention a network node includes a network interface, a cross connect switch coupled to the network interface, and a multi-medium network interface coupled to the cross connect switch. The multi-medium network interface includes multiple network interfaces, such as an optical interface and a wireless interface. The wireless interface could be for example an RF wireless interface or a free-space optics interface. Some embodiments of the present invention may include both an RF wireless interface and a free-space optics interface. A TDM user interface is also coupled to the cross connect switch. In some embodiments, the network interface is also a multi-medium network interface. Furthermore, some embodiments can include additional multi-medium network interfaces.

As stated above, some embodiments of the present invention allow TDM data to be combined with packet data. A Packet/TDM cross connect switch, having both a TDM switch and a packet switch, is used in these embodiments. Data packets are transformed into TDM packet columns. The TDM packet columns are combined with standard TDM data columns in the payload of a TDM data frame. Data packets may be sorted based on a priority scheme, in which high priority data packets are given precedence over lower priority data. However, both high priority and low priority may be combined in a TDM packet column To provide the quality and reliability of a fiber optic link over a wireless link, many embodiments of the present invention include a link quality management unit, which controls multiple transmission parameters of a wireless interface in response variable link conditions. For example, the link quality management unit of one embodiment of the present invention controls transmission power, modulation, and error correction. In general, a receiving network node provides feedback to a transmitting network node. Thus, in many embodiments of the present invention, the link quality management unit includes a signal quality detector, which measures a signal quality value, such as bit error rate, signal to noise ratio, or error vector magnitude. The measured signal quality is transmitted back to the transmitting node so that appropriate changes can be made to the transmission parameters.

To provide even greater quality of service, some embodiments of the present invention use a media abstraction unit to integrate link-layer management with network layer traffic management. As explained above, various transmission parameters are modified in response to changing environmental factors. The modification of the transmission parameters changes the available bandwidth of the wireless link. In accordance with some embodiments of the present invention, the available bandwidth of the wireless link is used at network layer traffic management. Specifically in one embodiment of the present invention, the amount low priority data packet within a TDM data frame is altered to use the available bandwidth.

The rigid bandwidth hierarchy of conventional TDM protocols is not suited for fully using the available bandwidth of a wireless link. Thus, many embodiments of the present invention use TDM frames that have payloads, which do not strictly conform to the bandwidth hierarchy of conventional TDM protocols. For example, many embodiments of the present invention form TDM frames having a payload that is a non-integer multiple of a base bandwidth, such as OC-1/STS-1.

The versatility provided by network nodes in accordance with the present invention allows the formation of networks using different types of links, links with differing bandwidth, data rates, and bit error rates, as well as both asymmetric and symmetric links. For example, a network can include a first network node coupled to a second network node with a wireless link. The network can include a third network node coupled to the second network node an optical link and coupled to the first network node by a wireless link. A fourth network node can be easily inserted between the third network node and the third network node using wireless links. The optical link between the second and third network nodes can operate at one bandwidth and the various wireless links would operate at other bandwidths depending on the environmental conditions between each pair of nodes.

The present invention will be more fully understood in view of the following description and drawings.

BRIEF DESCRIPTION OF THE DRAWINGS

FIG. 7(a) is a simplified block diagram of a network node in accordance with one embodiment of the present invention.

DETAILED DESCRIPTION

As explained above, conventional TDM networks are inefficient in terms of bandwidth utilization. Adapting TDM networks for bursty packet based data from computer networks can achieve higher bandwidth utilization. However, deployment of additional conventional network nodes limited to fiber optic links is time consuming and expensive. Thus, in accordance with one embodiment of the present invention, a multi-medium network node is configured to support TDM network protocols such as SONET/SDH/PDH. Furthermore, network node in accordance with some embodiments of the present invention support dynamic multiplexing of packet based data with TDM data into TDM SONET/SDH/PDH frames for use with conventional TDM networks nodes and equipment.

Figure 4:
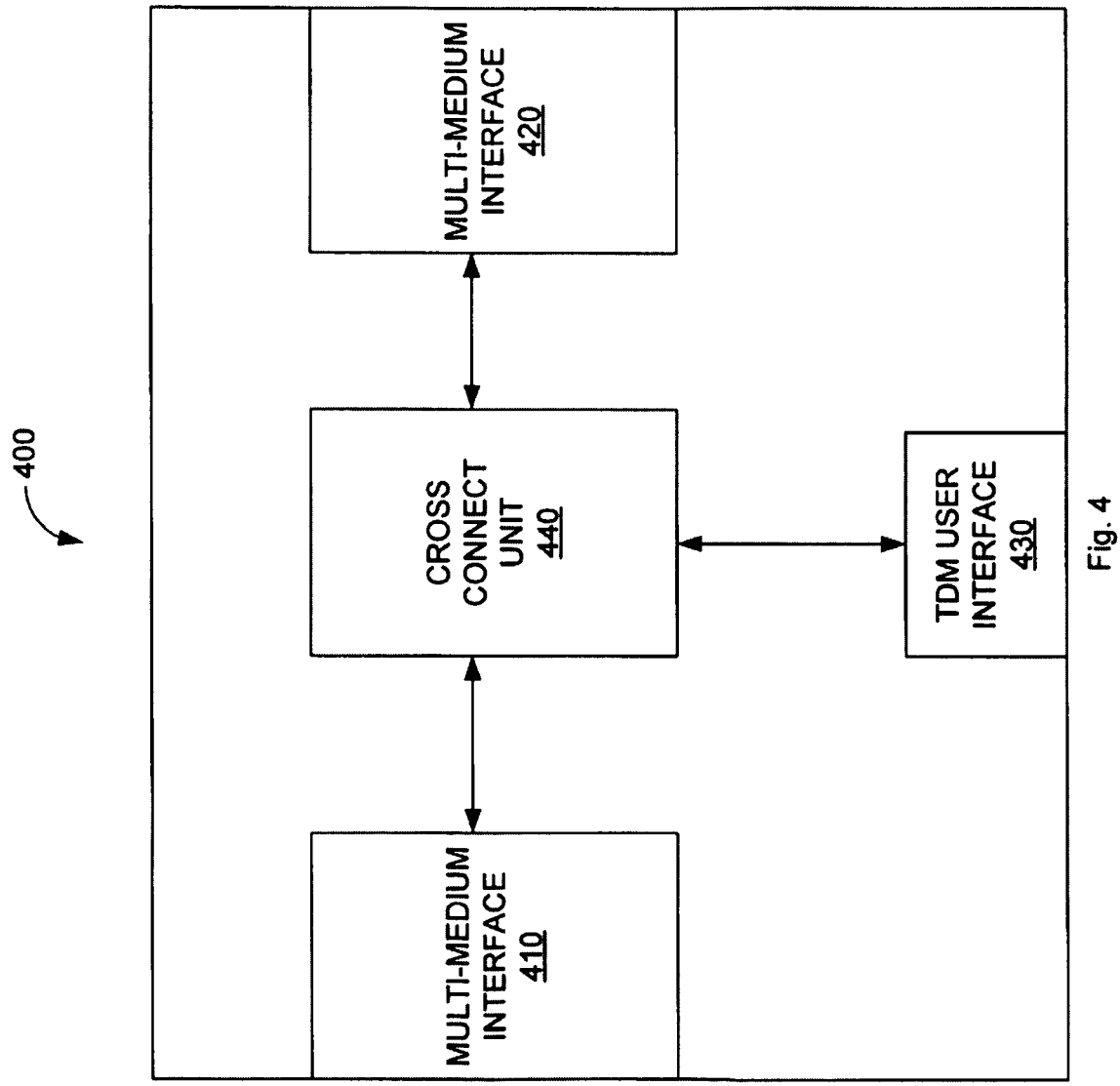
FIG. 4 is a simplified block diagram of a network node in accordance with one embodiment of the present invention.

FIG. 4 is a simplified block diagram of a multi-medium network node 400 in accordance with one embodiment of the present invention. Multi-medium network node 400 includes a first multi-medium interface 410, a second multi-medium interface 420, a TDM user interface 430, and a cross connect unit 440. Multi-medium interfaces 410 and 420 allow different physical medium to be used between network nodes. For example, in one embodiment of the present invention multi-medium interface 410 is configured to transfer data using fiber optic links and/or wireless network links. TDM user interface 430 provides an access point for receiving and transmitting packet or TDM data to user equipment or networks. Various embodiments of multi-medium network node 400 may provide TDM user interfaces with different network medium and protocols. Data from TDM user interface 430 is transferred to multi-medium interface 410 and/or 420 through cross connect unit 440. Conversely, data destined for the users of multi-medium network node 400 are received by multi-medium interfaces 410 and/or 420 and transferred to TDM user interface 430 through cross connect unit 440. Other embodiments of the present invention may include additional multi-medium interfaces to allow a multi-medium network node to simultaneously communicate with more than two other network nodes. Multi-medium interface 410 and 420, cross connect unit 440 and TDM user interface 430 are described in detail below.

Another embodiment of the present invention relates to asymmetric networking, in which multi-medium network node 400 interfaces to mediums with attributes differing in type of physical medium, link rates, protection mechanisms etc. For example the first multi-medium interface 410 may interface to an optical fiber at OC-48 rate using Unidirectional Path-Switched Ring (UPSR) or Bi-directional Line-Switched Ring (BLSR) protection for TDM and Intelligent Protection Switching (IPS) protection for packet, whereas the second multi-medium interface 420 interfaces to a wireless medium operating at OC-12 rate.

Figure 1:
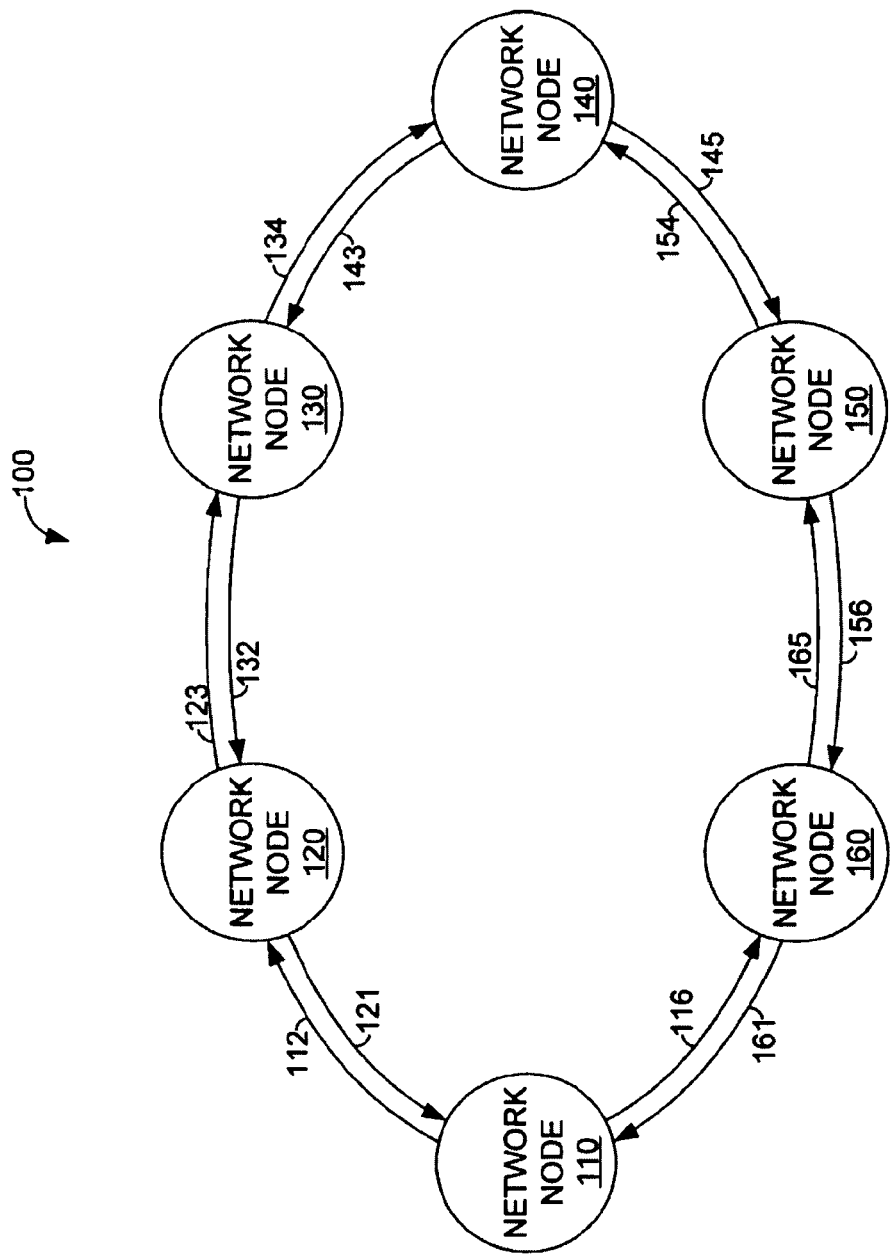
FIG. 1 is a block diagram of a typical TDM (SONET/SDH/PDH) based network.
Figure 2:
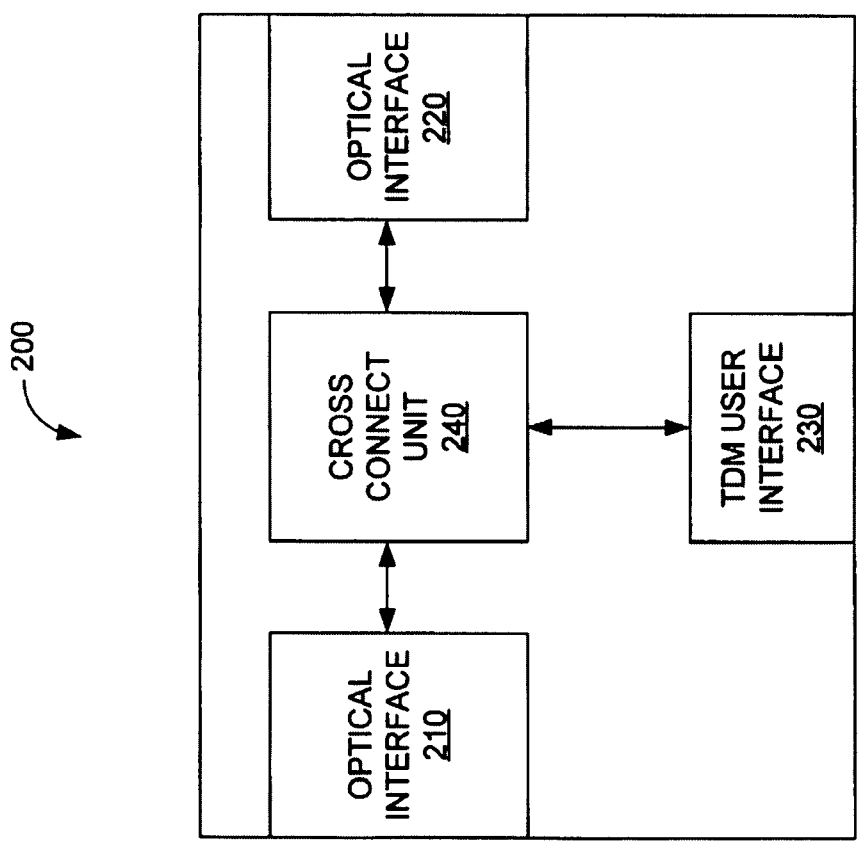
FIG. 2 is a simplified block diagram of a conventional network node.
Figure 3:
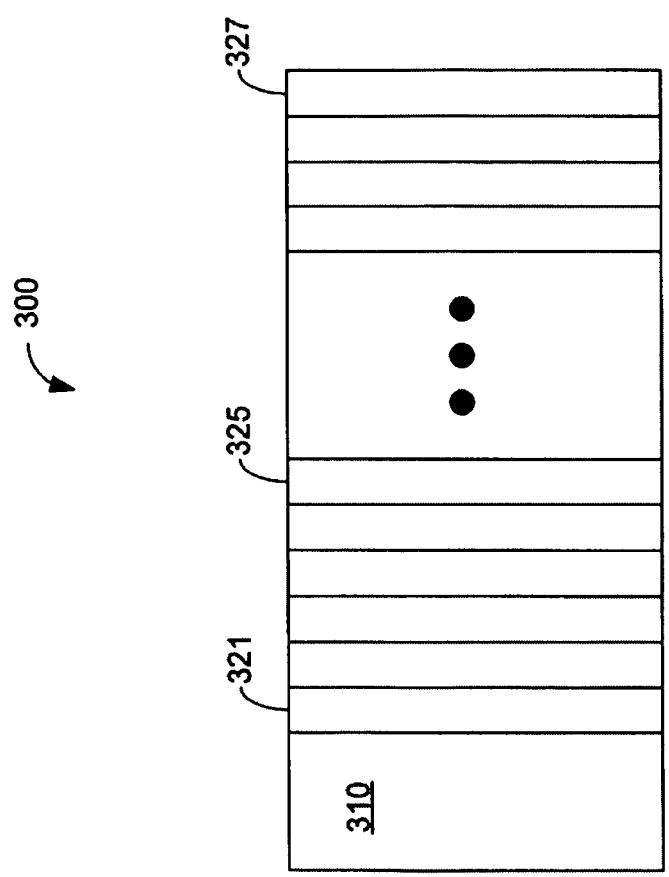
FIG. 3 is a conventional TDM frame.
Figure 5:
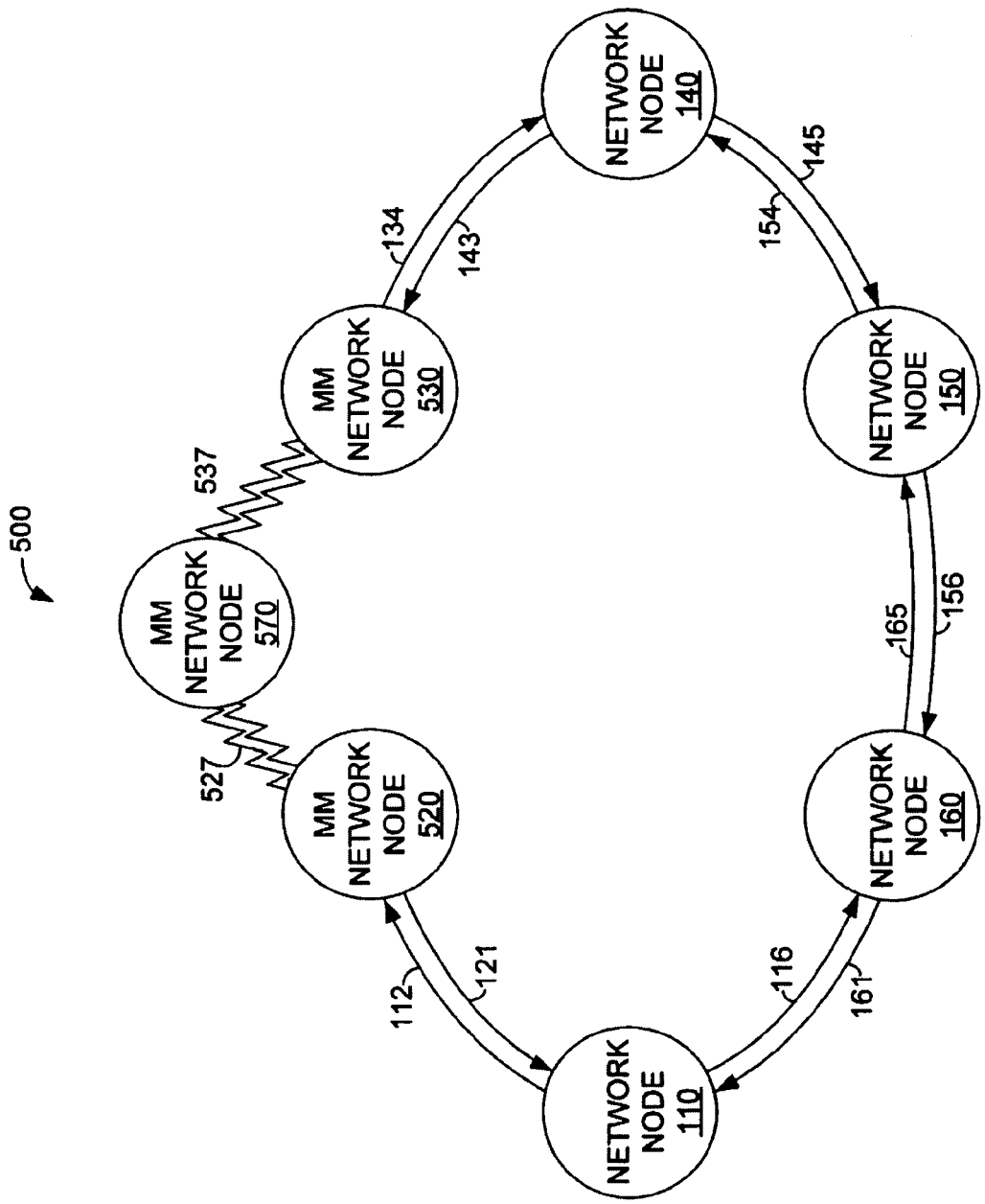
FIG. 5 is a block diagram of a network using multi-medium network nodes in accordance with one embodiment of the present invention.

FIG. 5 illustrates a ring network 500 adding multi-medium network nodes in accordance with one embodiment of the present invention. Because network 500 is similar to network 100 (FIG. 1) the description of unchanged elements is not repeated. In network 500 network nodes 120 and 130 are replaced with multi-medium network nodes 520 and 530, respectively. Multi-medium network node 520 communicates with network node 110 using conventional fiber optic links 112 and 121. Similarly, multi-medium network node 530 communicates with network node 140 using conventional fiber optic links 134 and 143. A Multi-medium network node 570 can be inserted between multi-medium network node 520 and 530 without the time and expense of installing fiber optic links to multi-medium network node 570. Specifically, multi-medium network node 570 communicates with multi-medium network node 520 and 530 using bi-directional wireless links 527 and 537, respectively. As explained below, multi-medium network nodes in accordance with different embodiments of the present invention can use different types of wireless links, such as RF (radio frequency) wireless links or free space optics links. Thus, additional network nodes can be easily added to conventional TDM networks without the time and cost of actually installing fiber optic links. If fiber optic links are still desired, multi-medium network nodes 520, 530, and 570 can be configured to first use wireless links and then change to the fiber optic links after they are installed. Furthermore, the multi-medium network nodes can be configured to use both the fiber optic links and the wireless links to increase bandwidth. Alternatively, the multi-medium network node can be configured to use the wireless link as a backup link when the fiber-optic link is unavailable. Also as explained below, embodiments of the present invention can replicate the redundancy of the dual ring architecture of conventional TDM networks when using wireless links. Because multi-medium network nodes in accordance to the present invention can be used with a variety of network mediums, embodiments of the present invention can be used in both homogenous and heterogeneous networks. For example, multi-medium network nodes can be used in networks having only fiber optic links between network nodes, networks having only wireless links between network nodes, and networks having both fiber optics and wireless links between network nodes. Furthermore, some embodiments of the present invention support both links having symmetrical attributes and links having asymmetrical attributes.

Some embodiments of the present invention include automatic configuration of new network nodes. In these embodiments, a new node link admission procedure is used to establish the links of the new network node. For example, in some embodiments of the present invention, new network nodes (or network nodes recovering from a link failure), are configured transmit a link connect request signal. The pre-existing network node is configured to respond with a link connect response. In some networks, a network operation center is used to configure the network nodes and to accept or reject new network nodes. Furthermore, some network nodes use authentication protocols to insure the new network node is acceptable to the network. After receiving the link connect response, the new network node transmits a link connect acknowledgement to activate the link.

Figure 6:
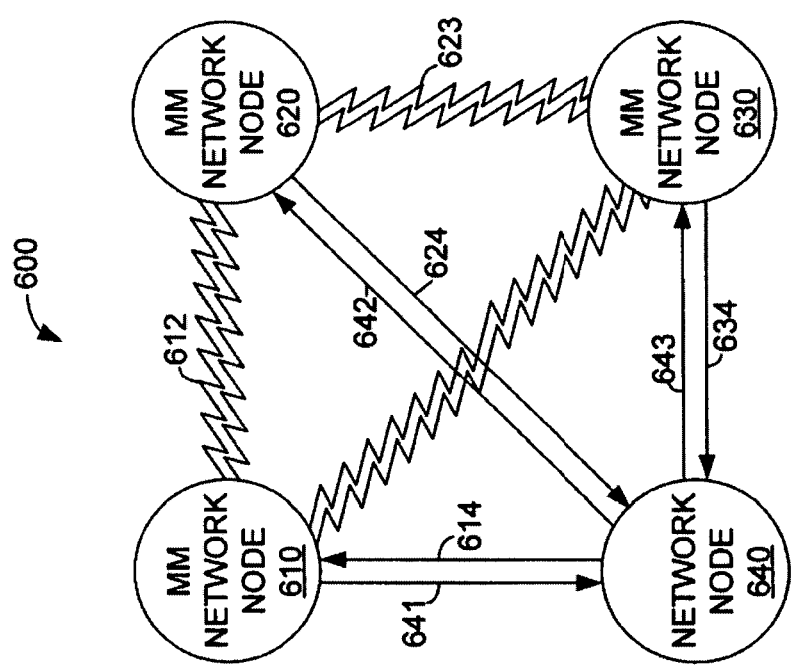
FIG. 6 is a block diagram of a network using multi-medium network nodes in accordance with one embodiment of the present invention.

FIG. 6 illustrates a mesh network 600 using multi-medium network nodes in accordance with another embodiment of the present invention. Specifically mesh network 600 includes multi-medium network nodes 610, 620, 630 and a conventional network node 640. Each multi medium network node in mesh network 600 includes three multi-medium interfaces, so that each multi-medium network node can be coupled to three other network nodes. Similarly, network node 640 includes three optical interfaces. Conventional network node 640 is coupled to multi-medium network nodes 610, 620, 630 using fiber optics links 614 and 641, fiber optic links 624 and 642, and fiber optic links 643 and 634, respectively. Multi-medium network node 610 is also coupled to multi-medium network nodes 620 and 630 using bi-directional wireless links 612 and 613, respectively. Multi-medium network node 620 is also coupled to multi-medium network node 630 by bi-directional wireless link 623. Multi-medium network nodes in accordance with the present invention can also be used in other network topologies, such as point-to-point and star topologies.

FIG. 7(a) is a block diagram of a multi-medium network node 700a in accordance with another embodiment of the present invention. Because multi-medium network node 700a is similar to multi-medium network node 400, the description of unchanged elements is not repeated. However, multi-medium network node 700a differs from multi-medium network node 400 by including a packet user interface 730 and replacing cross connect unit 440, with a Packet/TDM cross-connect unit 740. Packet/TDM cross connect unit 740 allows packet processing and dynamic mixing of TDM and Packet data. Packet user interface 730 receives and transmits data packet as used in packet-based networks such as Ethernet, IP, or other packet based networks. Data packets from packet user interface 730 are transferred to Packet/TDM cross connect unit 740 which dynamically mixes the packet data and TDM payload from TDM user interface 430 into TDM frames, such as SONET, SDH, or PDH frames, for transfer through multi-medium interface 410 or 420. Conversely, when data is received on multi-medium interface 410 or 420, Packet/TDM cross connect unit 740 decodes the TDM frames to demultiplex the packet data from the TDM data. Packet data is transferred to packet user interface 730 and TDM data is transferred to TDM user interface 430.

Packet/TDM cross connect unit 740 provides the transport paths for various interfaces of multi-medium network node 700a. Generally, Packet/TDM cross connect unit 740 receives payload from each interface and routes the payload to the appropriate interface. For example, received payload from multi-medium interface 410 may be destined for multi-medium interface 420, TDM user interface 430, or packet user interface 730. Similarly payload from multi-medium interface 420 may be destined for multi-medium interface 410, TDM user interface 430, or packet user interface 730. Data from TDM user interface 430 may be destined for multi-medium interface 410 or multi-medium interface 420. Similarly, data from packet user interface 730 may be destined for multi-medium interface 410 or multi-medium interface 420. Furthermore, the payload from one user on TDM user interface 430 may be destined to another user on TDM user interface 430 rather than being destined for multi-medium interface 410 or multi-medium interface 420. Similarly, packet data from a user of packet user interface 730 may be destined to another user of packet user interface 730 rather than being destined for multi-medium interface 410 or multi-medium interface 420.

Because, multi-medium network node 700a is designed for use in a TDM network, Packet/TDM cross connect unit 740 is configured to receive, process, and dispatch TDM frames from and to multi-medium interface 410 and multi-medium interface 420. Specifically, when a TDM payload of a TDM frame is received from multi-medium interface 410, Packet/TDM cross connect unit 740 must process the TDM payload to determine which parts of the TDM payload are "DROP Payload" and which parts are "THROUGH Payload." DROP payload refers to payload destined to users of multi-medium network node 700a that are coupled to Packet/TDM cross connect unit 740 through TDM user interface 430 or packet user interface 730. THROUGH payload refers to payload that is destined for other network nodes and is thus sent through multi-medium interface 420. Data from TDM user interface 430 or packet user interface 730 that are destined to multi-medium interface 420 are often referred to as "ADD payload" because the data can be added to a TDM frame. TDM frames from multi-medium interface 420 are treated similarly.

Figure 7B:
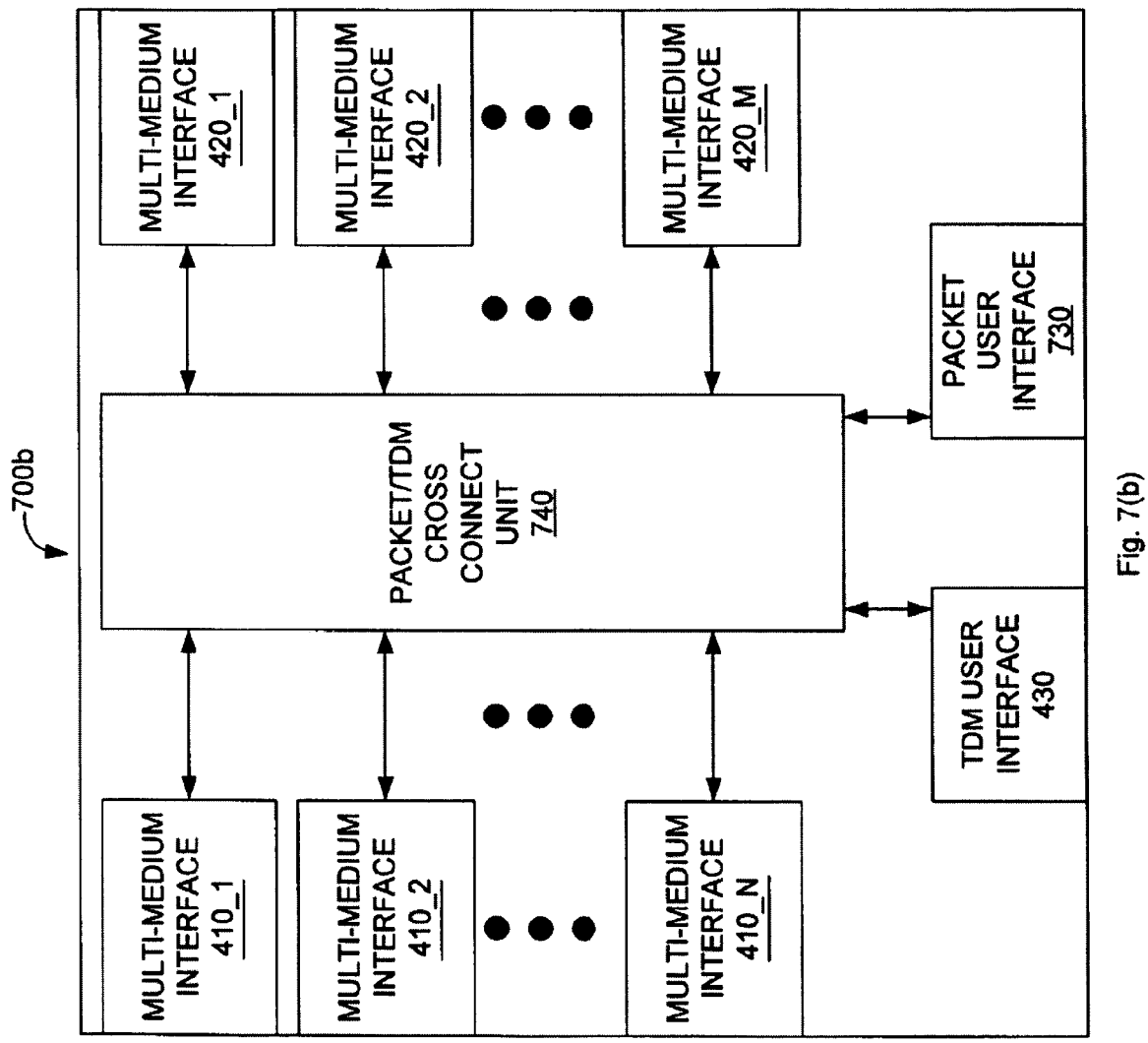
FIG. 7(b) is a simplified block diagram of a network node in accordance with one embodiment of the present invention.

FIG. 7(b) is a block diagram of a multi-medium network node 700b in accordance with another embodiment of the present invention. Because multi-medium network node 700b is similar to multi-medium network node 700a, the description of unchanged elements is not repeated. However, multi-medium network node 700b differs from multi-medium network node 700a by including multiple multi-medium interfaces 410_1, 410_2, . . . 410_N, 420_1, 420_2, . . . 420_M, where N and M are integers. Including multiple multi-medium interfaces allows more complicated network topologies, such as a mesh topology, star topology, subtending ring topology, multi-ring topology, or tree topology.

Figure 8:
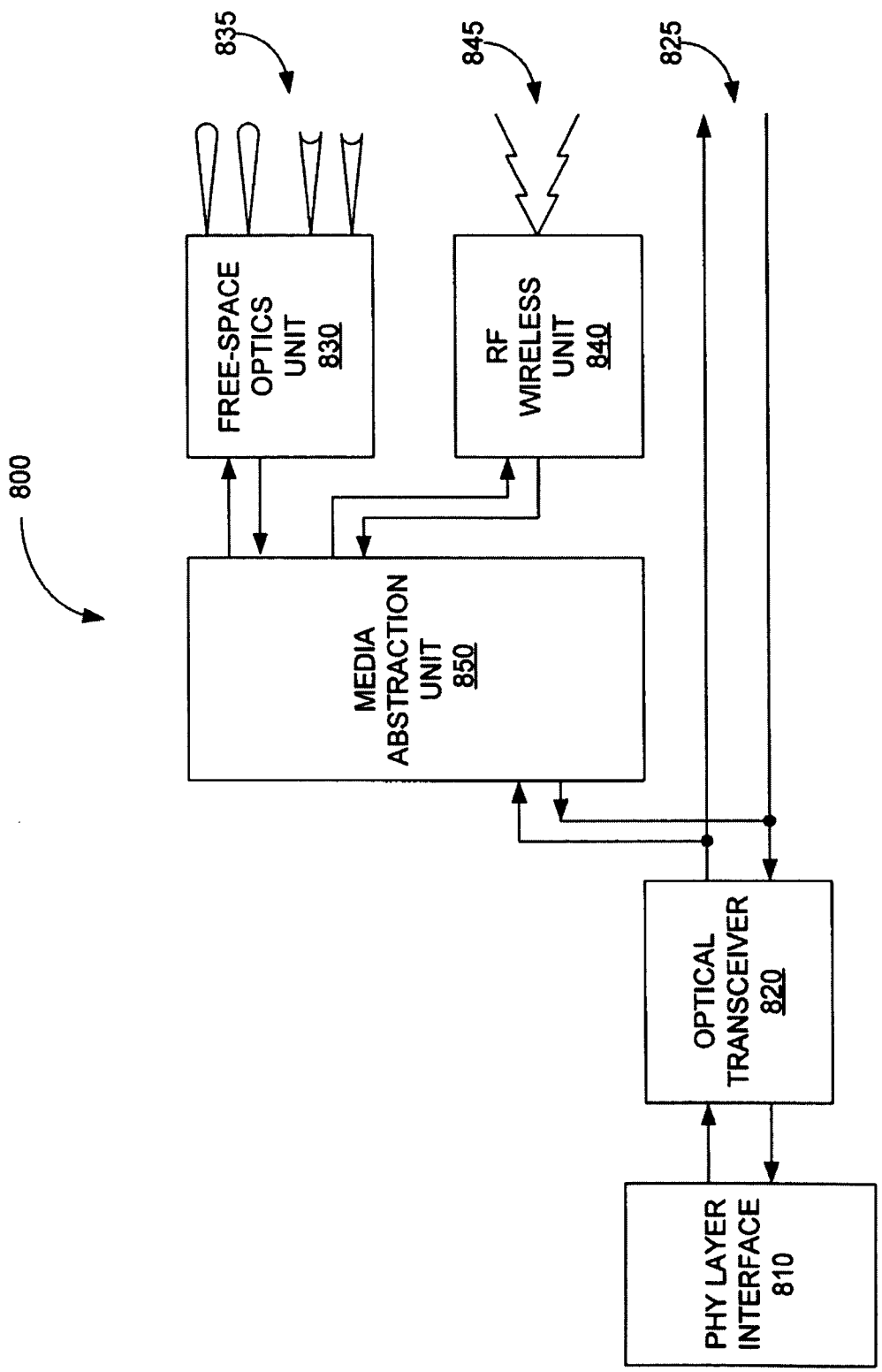
FIG. 8 is a block diagram of a multi-medium network interface in accordance with one embodiment of the present invention.

FIG. 8 is a block diagram of a multi-medium interface 800 (block 410 or 420 in FIG. 7(*a*)) having a fiber optics port and two wireless ports. Specifically, multi-medium interface 800 includes a fiber optics port 825, a free-space optics port 835 and a RF wireless port 845. Other embodiments of multi-medium interface in accordance with the present invention may use a different number of ports and different types of ports. For example some embodiments of the present invention may omit fiber optics port 825. Furthermore, different multi-medium interfaces on a multi-medium network node may have different ports. For example, a multi-medium network node in accordance with one embodiment of the present invention uses a standard fiber optics interface and only one multi-medium interface.

Multi-medium interface 800 includes a physical layer interface (PHY LAYER Interface) 810, which interfaces with cross connect unit 440 (FIG. 4) or Packet/TDM cross connect unit 740 (FIG. 7(*a*) and FIG. 7(*b*)). Physical layer interface 810 is coupled to optical transceiver 820. Specifically, parallel data from cross connect unit 440 or Packet/TDM cross connect unit 740 is converted into a serial bit stream for optical transceiver 820. Conversely, physical layer interface 810 converts serial data from optical transceiver 820 into parallel data for cross connect unit 440 or Packet/TDM cross connect unit 740.

Optical transceiver 820 transforms data received from physical layer interface 810 into an optical data stream to be transmitted at the fiber optics port 825. Optical transceiver 820 also transforms optical data received from fiber optics port 825 into serial format used by physical layer interface 810.

Media abstraction unit 850 enables the optical signal from optical transceiver 820 to seamlessly interface with other types of links, such as RF wireless medium and free-space optical medium. Media abstraction unit 850 includes a transmit path and a receive path. The transmit path of media abstraction unit 850 converts optical signal from optical transceiver 820 into an electrical data stream and reframes the data stream into a stream of electrical data frames that has a size particularly suited for wireless transmission. For example, in one embodiment of the present invention, media abstraction unit 850 reframes the data stream into data frames having a size of 255 bytes, which is well suited for RF wireless transmission. Media abstraction unit 850 determines the level of modulation for RF wireless unit 840 and the transmission power and level of coding for free-space optics unit 830 and RF wireless unit 840 using one or more link quality management units described below. Media abstraction unit 850 adjusts these parameters, which may change the capacity of the wireless link in response to changing environmental conditions. Electrical data frames from media abstraction unit 850 are converted into radio frequency signal by RF wireless unit 840 or into laser optical signal by the free-space optics unit 830. The receive path of media abstraction unit 850 reframes electrical data frames from RF wireless unit 840 or free-space optics unit 830 into TDM frames such as SONET/SDH/PDH frames and then converts the data stream into an optical signal. The optical signal is sent to optical transceiver 820 and then to physical layer interface 810.

As stated above, media abstraction unit 850 adjusts parameters of the wireless links between multi-medium network nodes, such as the modulation, transmission power and coding of the data stream in response to environmental conditions. Specifically, media abstraction unit 850 in the receiving multi-medium network node provides feedback to media abstraction unit 850 in the transmitting multi-medium network node. In one embodiment of the present invention, feedback is provided using control packet containing the dynamic status of link characteristics such as the received bit error rate, signal to noise ratio, power level, etc. The dynamic characteristics of wireless link are affected by factors like attenuation, phase distortion, noise, interference, scintillation, beam wandering, etc. Furthermore, atmospheric factors such as rain, snow, and fog may affect the link characteristics very significantly. Media abstraction unit 850 dynamically adjusts the attributes of the transmitted wireless signal such as the power, modulation, and coding to combat variation in link characteristics. For example, deterioration in link characteristics may be minimized by increasing the transmitted power or changing the digital modulation from a high 256-QAM to 16-QAM level. Additionally the transmitted power can be controlled automatically using the feedback information provided to Media abstraction unit 850. Generally, media abstraction unit 850 adjusts the attributes of the transmitted signal without degradation of the data flow on the wireless link.

Media abstraction unit 850 unit renders the wireless links transparent to the rest of the multi-medium network node at the same time makes the networking layer aware of the dynamic status of the wireless medium. As a result, the wireless links (both free space optics and radio frequency wireless) are as reliable as fiber optic links. In some embodiments, media abstraction unit 850 recovers the clocking signals in TDM systems such as, SONET, SDH, or PDH from a non-optical medium such as the wireless or free-space optical medium.

In the specific embodiment illustrated in FIG. 8, radio frequency wireless unit 840, free space optics unit 830, and the media abstraction unit 850 interfaces with optical transceiver 820 rather than directly with physical layer interface 810. Because media abstraction unit 850 is coupled to optical transceiver 820 using fiber optic links, media abstraction unit 850 and optical transceiver 820 can be placed far apart. For example, the portions of a multi-medium network node including optical transceiver 820 may be located inside a building and other portions of the multi-medium network node including media abstraction unit 850 may be located at rooftop or on a window of the same or another building.

RF wireless unit 840 receives the stream of electrical data frames from media abstraction unit 850 and broadcasts the data through RF wireless port 845. RF wireless units 840 also receives data through RF wireless port 845 and transform it into a stream of electrical data frames for media abstraction unit 850. In some embodiments of the present invention, RF wireless unit 840 uses a first frequency for transmitting data and a second frequency for receiving data.

Similarly, free space optics unit 830 transforms the stream of electrical data frames received from media abstraction unit 850 into an optical format for free space optics port 835. Free-space optics unit 830 also transforms optical data received from free-space optics port 835 into the stream of electrical data frames for media abstraction unit 850.

Figure 9:
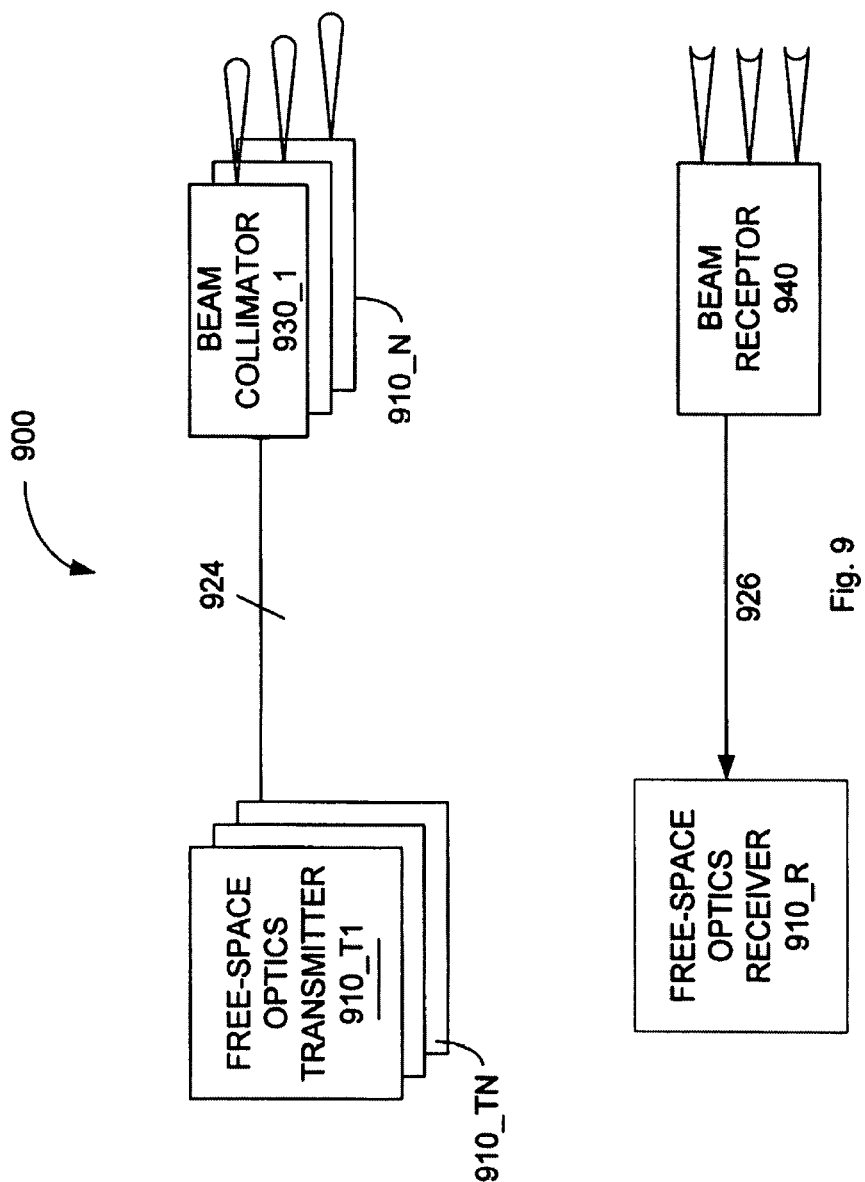
FIG. 9 is a block diagram of a free space optics network interface in accordance with one embodiment of the present invention.

FIG. 9 is a block diagram of a free space optics unit 900 that can be used as free-space optics unit 830 (FIG. 8). Free-space optics unit 900 includes one or more free-space optics transmitters 910_T1 to 910_TN (N may be greater than 1), a free-space optics receiver 910_R, optical fibers 924, optical fiber 926, beam collimators 930_1 to 930_N, and a beam receptor 940. Each free-space optics transmitter 910_T1 to 910_TN receives the same stream of electrical data frames from media abstraction unit 850 and converts the stream of electrical data frames into an optical signal. Each Beam collimator 930_1 to 930_N collimates optical signal from free-space optics transmitter 910_T1 to 910_TN, respectively, into a laser beam of a fixed aperture diameter and a small divergence angle. Optical assembly (not shown) of beam collimator 930_1 to 930_N transmits the laser beams in free space between network nodes. Generally, the aperture diameter and divergence angle are selected to base on the atmospheric conditions of the free space between the network nodes. Increasing the aperture diameter increases the power received at the receptor. Decreasing the beam divergence angle decreases the size of the footprint of the laser beam at the receptor, which increases the power received. However, a smaller footprint of the laser beam reduces the margin of tolerance of the beam wandering. Using multiple laser beams minimizes signal loss due to scintillation and other disruptions of line of sight transmission between two network nodes. Some embodiments of the present invention use spatial diversity with the multiple transmitted laser beams so that small flying objects such as birds do not disrupt the free-space optics link.

Beam receptor 940 receives one or more laser beams from another network node and focuses the beams onto an optical fiber 926. Optical fiber 926 provides optical signal to free-space optics receiver 910_R, which transforms the optical signals into a stream of electrical data frames for media abstraction unit 850. For embodiments of the present invention using spatial diversity, multiple beam receptors are used to captures the spatially diverse laser beams.

Figure 10:
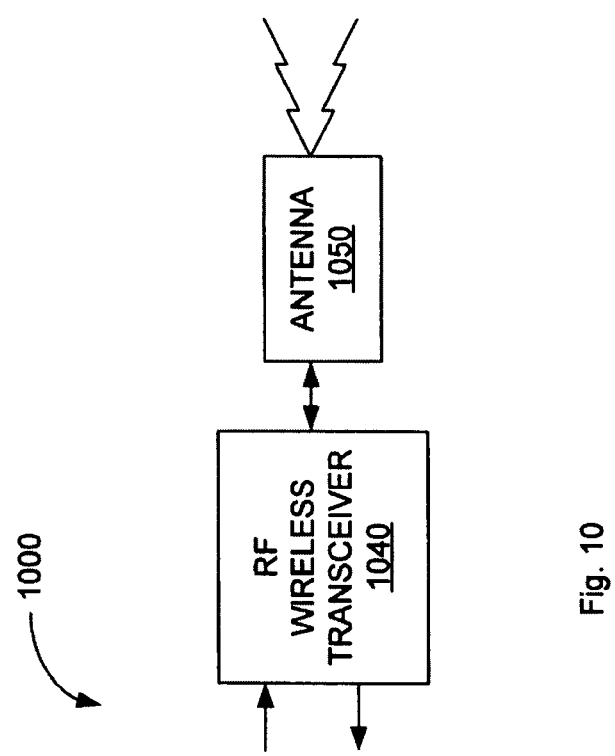
FIG. 10 is a block diagram of a radio frequency wireless network interface in accordance with one embodiment of the present invention.

FIG. 10 is a block diagram of a RF wireless unit 1000 that can be used as radio frequency (RF) wireless unit 840 (FIG. 8). RF wireless unit 1000 includes a radio-frequency (RF) wireless transceiver 1040, and an antenna 1050. RF wireless unit 1000 is used for both receiving data in the form of millimeter wave signals, i.e. radio signals, and transmitting data in the form of millimeter wave signals, i.e. radio signals. While receiving data, antenna 1040 receives radio signals and provides the received radio signals to RF wireless transceiver 1040. RF wireless transceiver 1040 converts the radio signals to a Quadrature Amplitude Modulated (QAM) base band electrical signal. Generally, a modulation/demodulation unit (modem) is included in link quality management unit (see FIG. 13) within media abstraction unit 850 and coupled to receive the QAM base band electrical signal. The modem demodulates and decodes the stream of electrical data frames from the QAM base band signal. For embodiments of the present invention using SONET, SDH, or PDH data format, media abstraction unit 850 implements a Phase Lock Loop (PLL) circuit that recovers a clock signal from the electrical data stream and generates the SONET/SDH/PDH clock for network synchronization.

While transmitting data, the stream of electrical data frames from Media abstraction unit 850 is modulated into a QAM base band electrical stream, which is then converted to millimeter wave signal by RF wireless transceiver 1040. Antenna 1050 is used to transmit the radio signal to another network node using RF wireless interfaces.

Figure 11A:
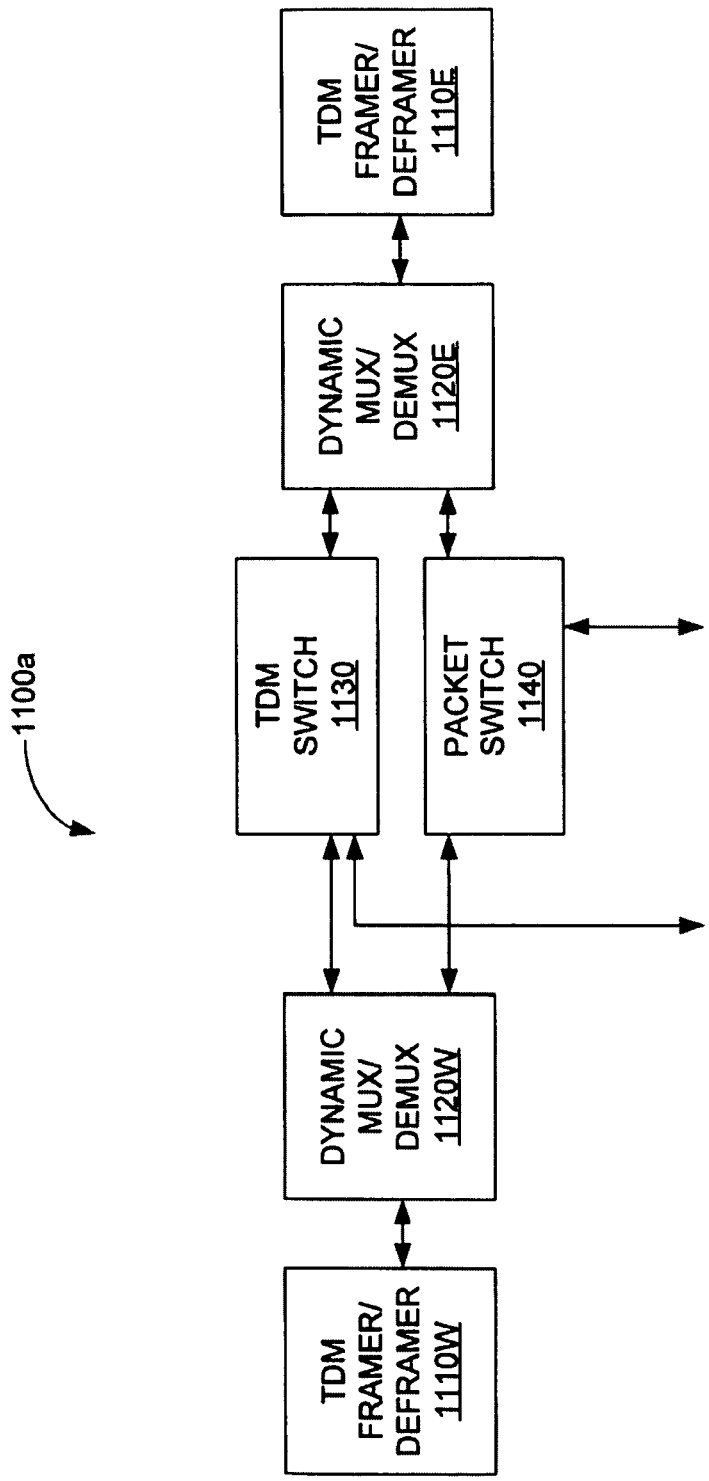
FIG. 11(a) is a block diagram of one embodiment of a TDM Cross connect unit/Packet switch.

FIG. 11(a) is a detailed block diagram of a Packet/TDM cross connect unit 1100a, which can be used as Packet/TDM cross connect unit 740. Due to the symmetry of receiving and transmitting data with multi-medium interfaces 410 and 420, Packet/TDM cross connect unit 1100a is often described with reference to a west side and an east side which include the same parts and provide the same functionality. Specifically, Packet/TDM cross connect unit 1100a includes TDM Framers/Deframers 1110E and 1110W (E refers to East and W refers to west), dynamic multiplexer/demultiplexers (MUX/DEMUX) 1120E and 1120W, a TDM switch 1130 and a packet switch 1140.

TDM Framer/Deframer 1110 W is generally coupled to physical layer interface 810 (FIG. 8) of multi-medium interface 410 (FIG. 7(a)). Incoming TDM frames, such as SONET frames, SDH frames, or PDH frames, are deframed by TDM framer/deframer 1110W. Payload from the TDM frame is sent to dynamic multiplexer/demultiplexer 1120W, which demultiplexes the payload into TDM data and packet data. Dynamic multiplexer/demultiplexer 1120W sends TDM payload and packet data to TDM switch 1130 and packet switch 1140, respectively. TDM switch 1130 determines the destination of the various portions of the TDM payload. DROP payload is routed to TDM user interface 430 (FIG. 7(a)). TDM switch 1130 is configured to receive ADD payload from TDM user interface 430 (FIG. 7(a)) and combines the THROUGH payload and the ADD payload and sends the resulting TDM payload to dynamic multiplexer/demultiplexer 1120E.

Packet switch 1140 determines the destination of each data packet from dynamic multiplexer/demultiplexer 1120W. DROP payload data packets are routed to packet user interface 730 (FIG. 7(a)). Packet switch 1140 also receives ADD payload data packets from packet user interface 730 (FIG. 7(a)). Packet switch 1140 combines the THROUGH payload and ADD payload and sends the resulting data packets to dynamic multiplexer/demultiplexer 1120E. Dynamic multiplexer/demultiplexer 1120E combine the packets to form TDM packet columns, i.e. TDM columns containing packet data. Then Dynamic multiplexer/demultiplexer 1120E combines the TDM payload and the data packets (as described below). The combined data is sent to TDM framer/deframer 1110E, which forms a TDM frame, such as a SONET frame, a SDH frame, or a PDH frame, and sends the TDM frame to physical layer interface 810 (FIG. 8) of multi-medium interface 420 (FIG. 7(a)). Data received by multi-medium interface 420 is processed similarly.

As mentioned before, the transport payload is packed into the payload columns of a TDM frame in a column-wise manner. The transport payload is provisioned in an integral number of columns in the TDM frame. If the TDM frame is not provisioned to full capacity, the non-provisioned columns are filled with dummy (non-data) characters. Thus, some of the total bandwidth of a TDM network may be unused during normal operation. However, with multi-medium network node 700a or 700b the non-provisioned columns can be filled with data packets to fully utilize the available bandwidth.

Figure 11B:
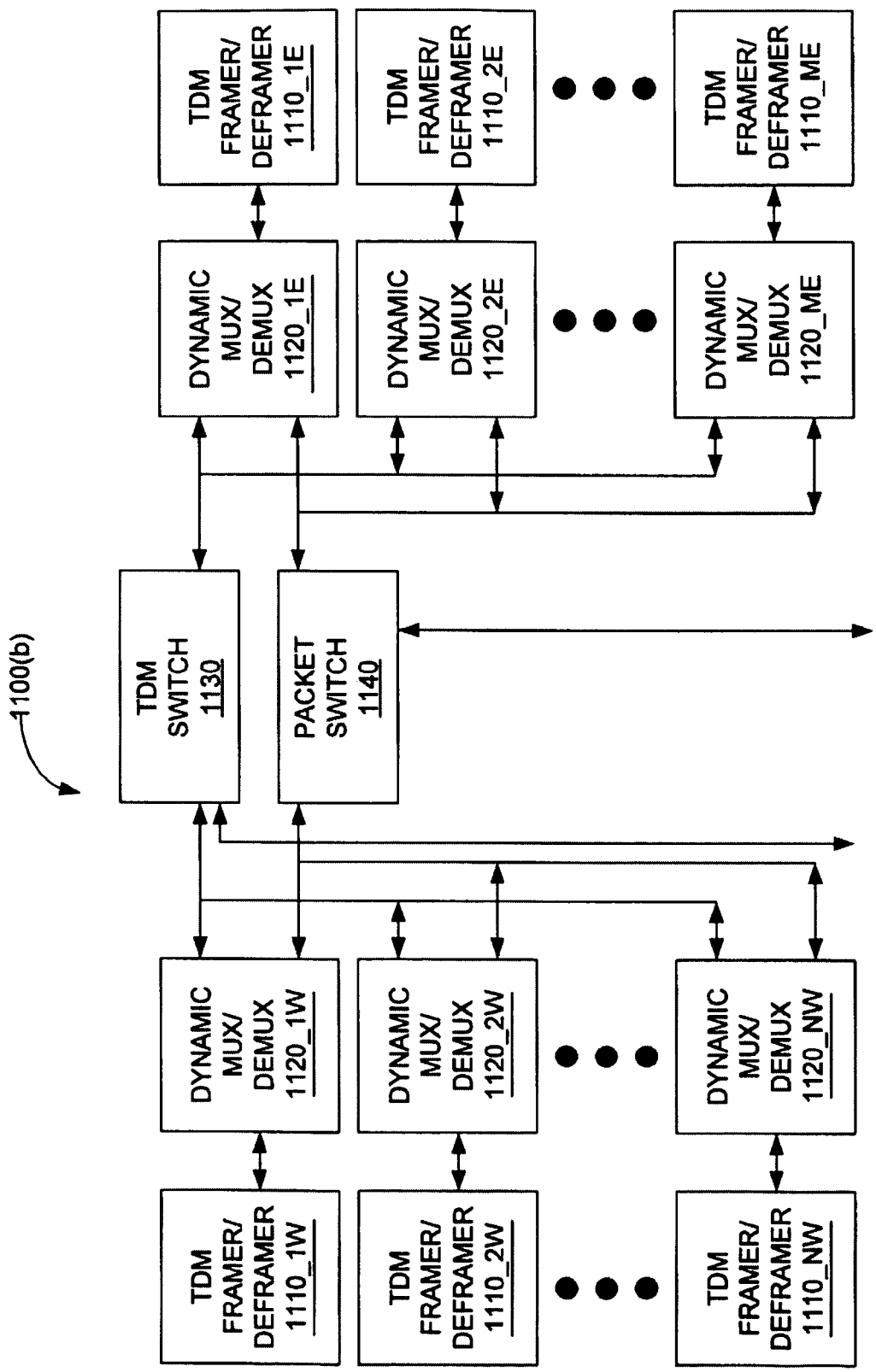
FIG. 11(b) is a block diagram of one embodiment of a TDM Cross connect unit/Packet switch.

FIG. 11(b) is a block diagram of a Packet/TDM cross connect unit 1100b, which is used in some embodiments of multi-medium network node 700b (FIG. 7(b)). Because Packet/TDM cross connect unit 1100b is similar to TDM/cross connect unit 1100a, the description of unchanged elements is not repeated. However, TDM/cross connect unit 1100b differs from TDM/cross connect unit 1100a by including multiple TDM/Framer a TDM Framer/Deframer and Dynamic Mux/Demux for each multi-medium interfaces of multi-medium network node 700b. Thus, Packet/TDM cross connect unit 1100b includes TDM Framer/Deframers 1110_1W, 1110_2W, ... 1110_NW, 1110_1E, 1110_2E, ... and 1110_ME. Packet/TDM cross connect unit 1100b also includes dynamic mux/demux 1120_1W, 1120_2W, ... 1120_NW, 1120_1E, 1120_2E, and 1120_ME.

Figure 12:
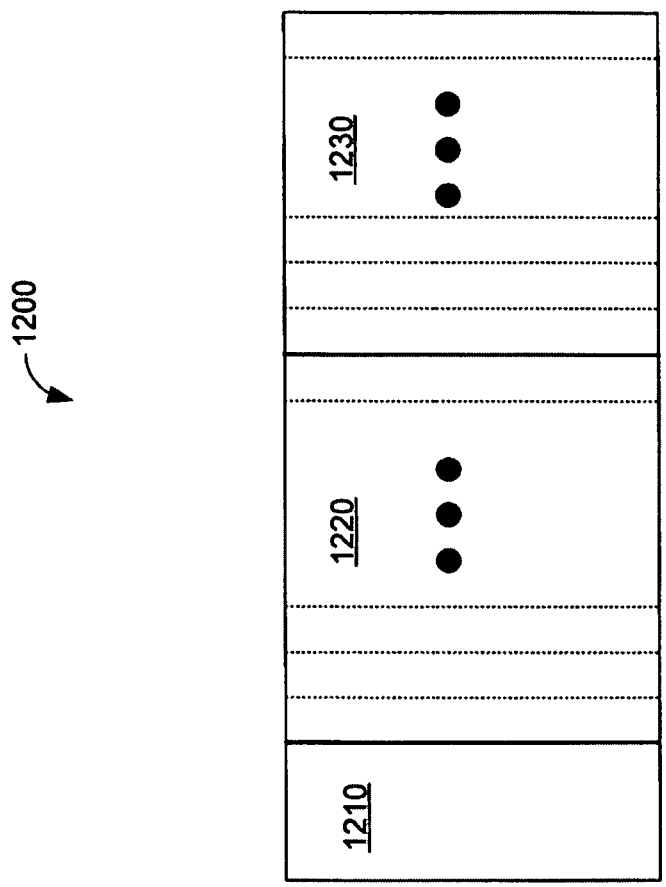
FIG. 12 is a diagram of a partially filled SONET frame, that is, fractional OC-X in accordance with one embodiment of the present invention.

As illustrated in FIG. 12, a TDM frame 1200 is divided into three portions: a header portion 1210, and TDM portion 1220, and a packet portion 1230. TDM frame 1200 can be for example a SONET frame, a SDH frame, or a PDH frame.

TDM portion 1220 contains TDM payload and packet portion 1230 contains TDM packet columns holding the data packets. The number of channels having TDM payload determines the sizes of TDM portion 1220 and packet portion 1230. For example, if TDM payload were large enough to fill the entire TDM frame, TDM portion 1220 would fill in all columns in the payload columns of TDM frame 1200. Thus, packet portion 1230 would not exist in that particular TDM frame. Conversely, if there is no TDM payload, TDM portion 1220 is not necessary, and packet portion 1230 can use the entire payload columns of TDM frame 1200. In general, TDM portion 1220 has priority over packet portion 1230 and packet portion 1230 can be provisioned only in columns that are not provisioned for the TDM payload.

Some embodiments of the present invention have different classes of packet data; such has high priority data packets and low priority data packets. Generally, high priority packet data has guaranteed delivery and takes precedence over low priority data packets. Thus, if the packet portion 1230 has insufficient capacity to carry both the high-priority data packets and the low priority data packets, some of the low priority data packets are not sent. The TDM payload commands precedence over all types of packet data. Any packet data that is not sent is either dropped or the packet protocols take care of retransmission at a later time.

Conventional TDM networks have a pre-defined hierarchy of network bandwidth and TDM frame size. For example, SONET/SDH/PDH networks only allow network bandwidth to be integral multiples of a base bandwidth like OC-1 and STM-1. The pre-defined hierarchy is suitable for fiber optic links because fiber optic links have very reliable transmission quality. However, for wireless links transmission quality can vary due to a variety of factors such as rain, snow, fog, and electromagnetic interference. Typically, according to the TDM hierarchy, if a given bandwidth cannot be guaranteed, the connection drops down to the next pre-defined bandwidth. However, with wireless links, the obtainable bandwidth may be very close to a pre-defined bandwidth. Dropping to the next highest bandwidth may result in underutilizing the available bandwidth of the wireless link. For example, multi-medium network nodes configured for a SONET/SDH/PDH network using OC-12 speeds (approximately 622.08 Mbps) may only be able to support 600 Mbps due to rain. The SONET/SDH/PDH hierarchy of bandwidths dictates that OC-3 (Approximately 155.52 Mbps) speeds be used when OC-12 is not available. By conforming to the SONET/SDH/PDH hierarchy approximately 444.48 Mbps of available bandwidth is wasted. However, if multi-medium network nodes could operate at OC-11.6 the full 600 Mbps bandwidth could be utilized.

Thus, some embodiments of the present invention are configured to support any network bandwidths and are not limited to multiples of a base bandwidth. These embodiments allow a network link to transmit true TDM frames, such as SONET frames. SDH frames, or PDH frames, at fractional OC-x rates such as in the above example OC-11.6 rate while conforming to the appropriate TDM requirements such as the GR-253 SONET/SDH/PDH/SDH requirements for transport overheads, timing, jitter, alarm conditions etc.

Media abstraction unit 850 in FIG. 8 on the transmitter side detects and determines when a wireless link can be optimized by running at a fractional OC-x rate. Media abstraction unit 850 packs the transmission payload into a portion of a standard TDM frame (e.g., a OC-n/STM-n SONET/SDH/PDH/SDH frame), which is just sufficient to allow transmission at the OC-x rate.

Specifically, media abstraction unit 850 determines a fractional payload size and creates a TDM frame using a transmission payload (TDM, high-priority packets, and low-priority packets) that is less than or equal to the fractional payload size. The shortened payload allows media abstraction unit 850 to form a TDM frame, which can be supported by the fractional OC-x rate. For example, the meaningful information is packed into payload sized up to OC-11.6 rate using TDM frames typically used for OC-12 rates. In most embodiments of the present invention, the TDM header is generated as if the higher data rate is being used. In these embodiments, the header of the OC-X frame would be identical to the header of the OC-N frame. Media abstraction unit 850 also chunks the fractional OC-x TDM frame to be transmitted into N M-byte (M being an integer) radio frames. In one embodiment of the present invention, media abstraction unit 850 uses 255-byte radio frames. Generally, the size of a radio frame is much shorter than that of an STS-n frame because shorter frames are less affected by the noise bursts and multi-path fading occurrences in a dynamic wireless link. Additionally, the error correction efficiency is superior in shorter frames. The radio frames in addition carry control channel, timing/synchronization, payload (containing fractional OC-x byte stream) and error correction fields. The radio frames are transmitted using a wireless transmit clock generator, which is synchronized with the TDM clock. The transmitting subsystem consists of modem 1030, the RF wireless transceiver 1040 and the antenna 1050.

At the receiving end, the incoming stream of radio frames is re-assembled in media abstraction unit 850 to re-create the partially filled OC-x frame. Furthermore, the TDM timing is recovered from the incoming stream to maintain the TDM timing and synchronization. Media abstraction unit 850 extends the payload of the OC-X frame to create standard OC-n/STM-n frame by filling the unfilled portion of the payload with stuff bytes. The complete OC-n frames are routed via media abstraction unit 850, optical transceivers 820, physical layer interface 810 and then multi-medium interface 410 or 420 in FIG. 7.

Figure 13:
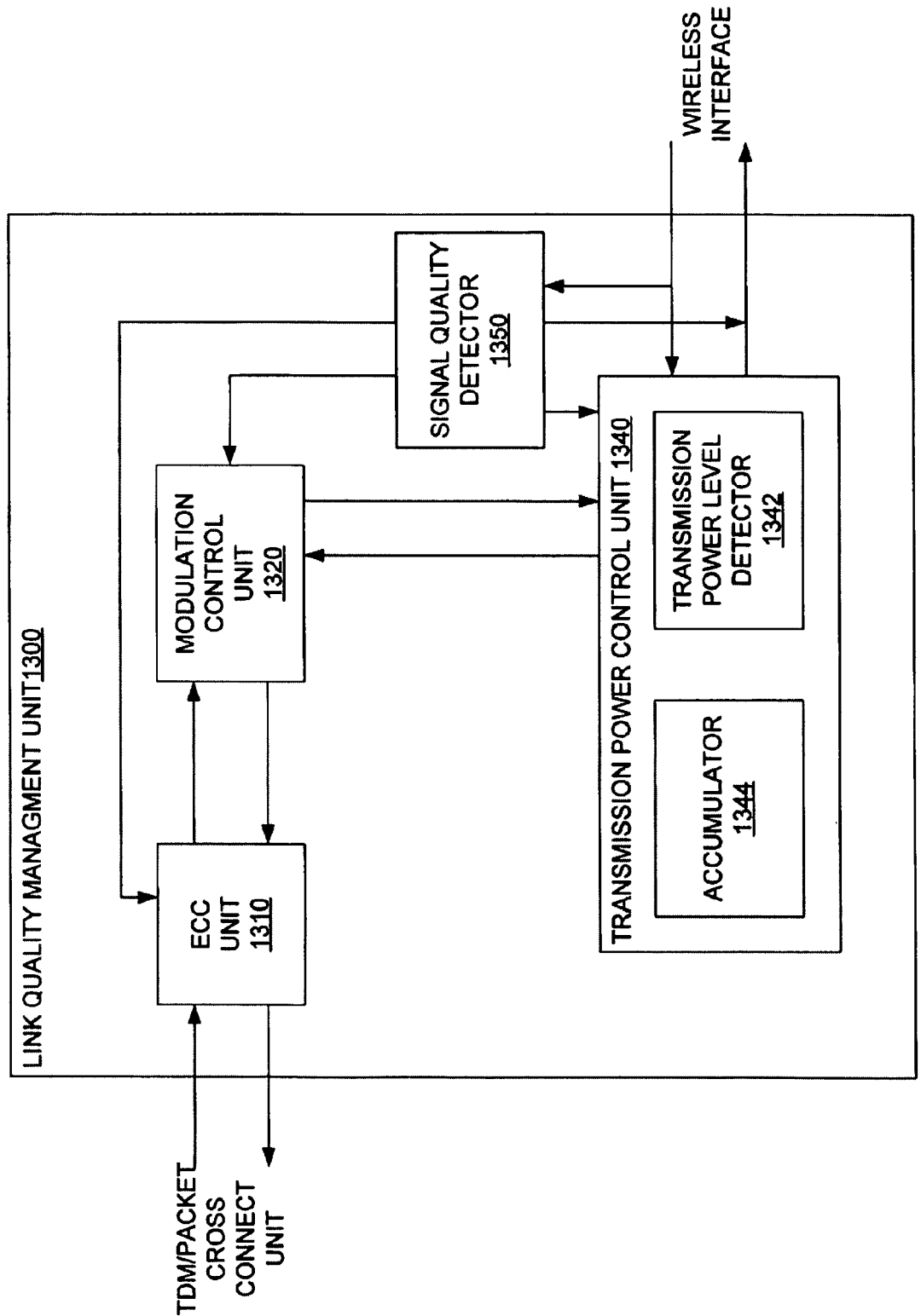
FIG. 13 is a block diagram of a link quality management unit in accordance with one embodiment of the present invention.

As explained above, various conditions can degrade the performance of wireless links. Therefore, many embodiments of the present invention include one or more link quality management unit in media abstraction unit 850. The link quality management unit controls multiple transmission parameters that adapt the transmission signal of a wireless interface to provide more reliable data transmission over changing link conditions. FIG. 13 is a block diagram of a link quality management unit 1300. Link quality management unit 1300 controls a wireless interface (such as free-space optics unit 830 (FIG. 8) or RF wireless unit 840 (FIG. 8)), which is communicating with a second wireless interface in another network node. Link quality management unit 1300 includes an error correcting code (ECC) unit 1310, a modulation control unit 1320, a transmission power control unit 1340, and a signal quality detector 1350. In general, the transmission signal for the wireless link is received from a Packet/TDM Cross Connect Switch as described above, ECC unit 1310 adds redundancy to the signal in the form of error correction codes. The signal is then modulated in modulation control unit 1320. Transmission power control unit 1340 then determines the proper transmission power for the signal, which is sent to the wireless interface as a control signal. The signal then goes to the wireless interface where the transmission power of the signal is set to proper level using the control signal sent by the transmission power control unit before transmission. Received signals are received at the wireless interface. Modulation control unit 1320 demodulates the received signal. ECC unit 1310 uses the error correction codes to correct errors that may have occurred during transmission and then provides the received signal to the Packet/TDM Cross Connect Switch as described above. In some embodiments of the present invention, link quality management unit 1300 omits modulation control unit 1320. For example, if the wireless interface is a free-space optics interface, modulation control unit 1320 is not used.

On a receiving node, signal quality detector 1350 determines the signal quality of an incoming signal from a wireless interface of a transmitting node. The signal quality is transmitted back to signal quality detector 1350 of the transmitting node. The signal quality is then provided to ECC unit 1310, modulation control unit 1320 and/or transmission power control unit 1340. ECC unit 1310, modulation control unit 1320, and transmission power control unit 1340 can use the signal quality from signal quality detector 1350 to adapt the transmission signal to improve the signal quality. Signal quality detector 1350 can use different quality measures such as bit error rate, signal to noise ratio, and error vector magnitude.

Link quality management unit 1300 uses transmission power control unit 1340 to dynamically adjust the transmission power of the wireless interface in a transmitting node, i.e., the node that is transmitting a data stream, to obtain a desired signal to noise ratio (SNR) at the receiving node to compensate for changing noise conditions on the wireless link. Transmission power control unit 1340 includes a received power level detector 1342 and an accumulator 1344. On a receiving node, i.e. the node that is receiving a data stream, received power level detector 1342 of transmission power control unit 1340 measures the power level of the incoming data stream. Received power level detector 1342 then compares the measured transmission power level against a threshold value, which may depend on the level of modulation set by modulation control unit 1320, to generate a received power error value. The received power error value is provided to the link quality management unit on the transmitting node.

On the transmitting node, accumulator 1344 accumulates the received power error level and adjusts the transmission power of the wireless interface on the transmitting node. Specifically, accumulator 1344 increments if the transmission power error level is positive and decrements if the transmission power error level is negative. When the value in accumulator 1344 is positive the transmission power level of the wireless interface in the transmitting node is increased. Conversely, when the value in accumulator 1344 is negative the transmission power level of the wireless interface in the transmitting node is decreased. A problem with increasing transmission power levels is that interference from the wireless link to other wireless devices increases with the transmission power level. Thus, the transmission power level must be kept to optimum level enough to avoid interference and maintain BER performance.

Link quality management unit 1300 can also adjust the modulation used in the wireless interface of a transmitting node. Specifically, modulation control unit 1320 adjusts the modulation of the wireless interface to maintain a desired signal quality as provided by signal quality detector 1350. For example, in one embodiment of the present invention, modulation control unit 1320 selects between quadrature phase shift keying, and various levels of quadrature amplitude modulation to maintain a bit error rate of 10-12 or better. When the signal quality is less than the desired signal quality level, modulation control unit 1320 decreases the modulation level. Conversely, when the signal quality is greater than the desired signal quality, modulation control unit 1320 increases the modulation level. To prevent constant modulation changes, some embodiments of modulation control unit 1320 are configured to increase the level of modulation only if the signal quality is significantly greater than the desired signal quality level. In general, link quality management unit 1300 can adjust the modulation of the wireless interface without causing degradation of the traffic flow on the wireless link.

For example, when the bit error rate is greater (i.e. the data stream is of lower quality) than the desired bit error rate, modulation control unit 1320 decreases the modulation level. Conversely, when the bit error rate is less (i.e. the data stream is of higher quality) than the desired bit error rate modulation control unit 1320 increases the level of modulation. To prevent constant modulation changes, some embodiments of modulation control unit 1320 are configured to increase the level of modulation only if the bit error rate is significantly lower than the desired bit error rate.

Link quality management unit 1300 can also improve the reliability of a wireless link by using forward error correction techniques. Specifically, in a transmitting node, the outgoing data signal is encoded using error correction unit 1310, which adds redundancy into the data signal. In the receiving node, the incoming data signal is decoded using error correction code unit 1310. As the wireless link becomes less reliable, link quality management unit 1300 increases the level of redundancy added by error correction code unit 1310. Conversely, as the wireless link becomes more reliable, link quality management unit 1300 decreases the level of redundancy added by error correction code unit 1310. In general, link quality management unit 1300 can adapt the level of forward error correction in the wireless interface without causing degradation of the traffic flow on the wireless link.

Figure 14:
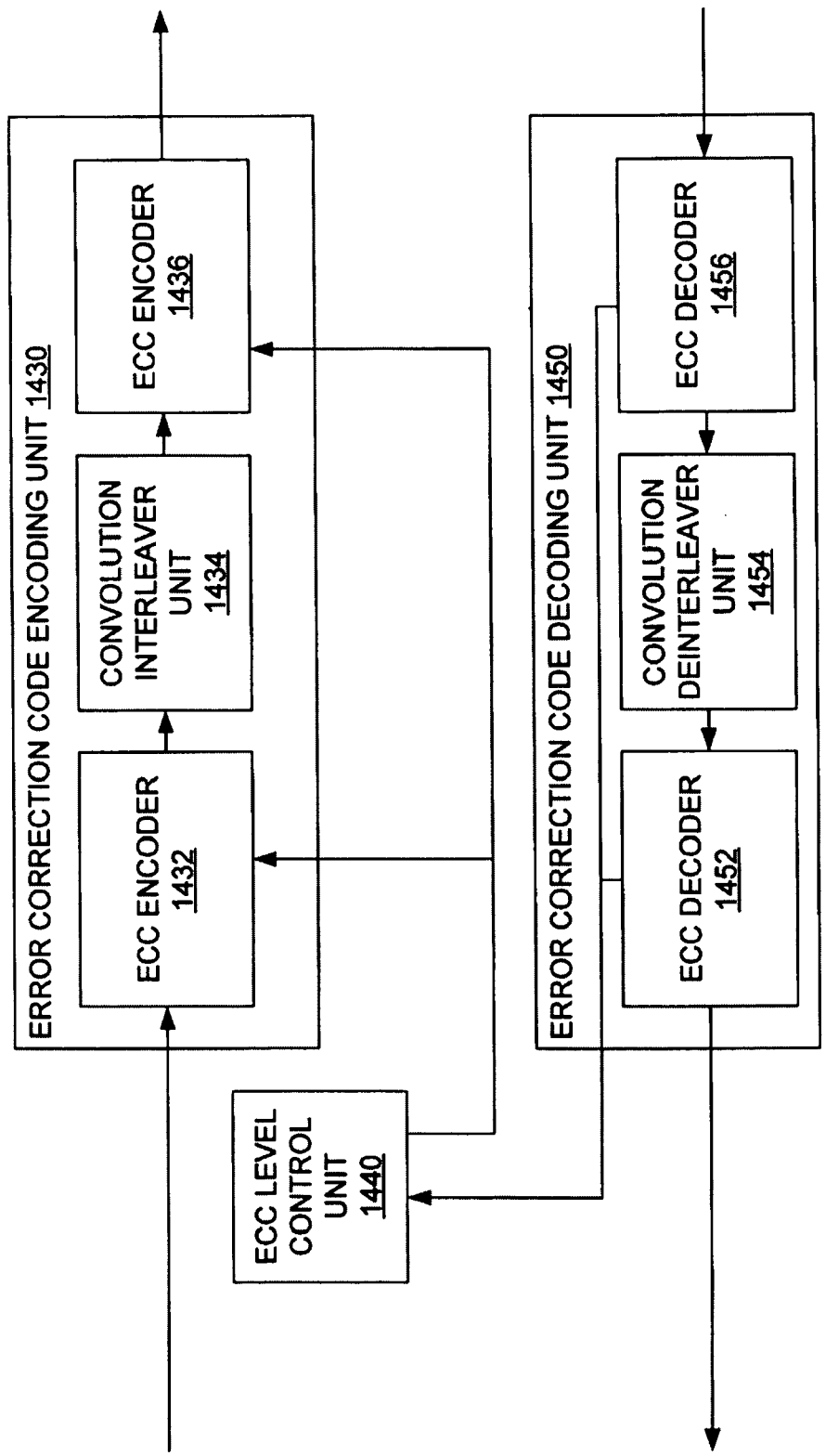
FIG. 14 is a block diagram of an error correcting code unit in accordance to one embodiment of the present invention.

The specific error correction codes used by error correction code unit 1310 can vary. FIG. 14 shows an embodiment of error correction code unit 1310 having an error correcting code encoding unit 1430, which uses a dual encoding scheme and thus includes a first ECC encoder 1432 and a second ECC encoder 1436, as well as a convolution interleaver unit 1434. In a specific embodiment, ECC encoder 1432 first encodes the data stream using Reed-Soloman codes. Then convolution interleaver unit 1434 is used to interleave the data at the transmit node so that at the receive node when the data is deinterleaved the errors are spread out and error bursts are not seen within the data stream. Finally, ECC encoder 1435 uses a trellis code to encode the data stream.

The incoming data stream is decoded by error correction code decoding unit 1450. Specifically, ECC decoder 1456 decodes the incoming data stream to correct errors using the redundancy added by ECC encoder 1436. Then Convolution deinterleaver unit 1454 counteracts the interleaving performed by convolution interleaver unit 1434. Finally, ECC decoder 1452 decodes the incoming data stream to correct errors using the redundancy added by ECC encoder 1432.

As the wireless link becomes less reliable, link quality management unit 1300 uses ECC level control unit 1440 to increase the level of redundancy added by error correction code encoding unit 1430. Conversely, as the wireless link becomes more reliable, link quality management unit 1300 uses ECC level control unit 1440 to decrease the level of redundancy added by error correction code encoding unit 1440. Generally, the effectiveness of the error correction is provided to ECC level control unit by the ECC decoders in error correction code decoding unit 1450. Other embodiments of the present invention may use a single level of error correction code. For example in one embodiment of the present invention a single level of REED-SOLOMON error correction code is used for a free-space optics wireless interface.

Link quality management unit 1300 can adapt the wireless interface using transmission power, modulation level, and forward error correction independently to insure high reliability data transfers over the wireless link. However, some embodiments of the present invention use a more structured approach to selecting the various parameters of the wireless interface. For example, in some embodiments of the present invention, modulation level is not changed if acceptable performance can be achieved by modifying transmission power. Similarly, in some embodiments of the present invention, the level of redundancy in the error correction codes is not modified if acceptable performance can be achieved by modifying modulation level.

To provide even greater quality of service, some embodiments of the present invention integrate link-layer management with network layer traffic management. A variety of techniques are used to provide the integration of link-layer management with network layer traffic management. For example, as explained above data packets can be prioritized so that during times of limited bandwidth high priority data packets are sent while low priority data packets are dropped. Specifically, in some embodiment of the present invention, after installation of a multi-medium network node a worse case bandwidth is determined for the wireless link. In one embodiment, the worse case bandwidth is the maximum bandwidth that the wireless link can support during 99.999% of the operating time of the multi-medium network node. Packet/TDM Cross Connect Switch 740 (FIG. 7(*a*)) is configured so that TDM data and high priority packet data is limited to the worse case bandwidth. Because of the integration of the network layer with the physical layer, low priority packet data can use whatever bandwidth is available in each TDM data frame. Specifically, media abstraction unit 850 monitors the actual available bandwidth as configured by link quality management unit 860. The available bandwidth is provided to Packet/TDM Cross Connect Switch 740 which can then form TDM data frames that can make use of the available bandwidth.

Furthermore, media abstraction unit 850 can be configured to provide link quality parameters (e.g. bandwidth, latency) to a traffic management module that can minimize traffic congestion. In a specific embodiment of the present invention, traffic congestion is managed using a plurality of queues. Specifically, the bandwidth of a link is calculated based on the link quality of the link. Each level of service (i.e. priority level of data) has a queue with a size that scales with the available bandwidth.

In some embodiments of the present invention, media abstraction unit 850 would also inform the network layer traffic manager of link failures so that the network layer traffic manager can use the routing protocols to reroute data around the failed link. Furthermore, in some of these embodiments, the link quality parameters may be used for load balancing and other network layer functions.

Some embodiments of the present invention also include intelligent network management mechanisms to perform such functions as new node discovery, network topology determination, link establishment/re-establishment, admission controls, network design and planning, link status monitoring, fault detection, and asynchronous wireless ring protection switching. For example, in one embodiment of the present invention, the intelligent network management unit of a network node having a wireless interface can automatically discover other network nodes using wireless interfaces. In addition, insertion and removal of the network nodes with wireless interfaces can be performed without disrupting other data traffic on the network. Furthermore, the some embodiments of the present invention provide ongoing monitoring of wireless links so that smart protection switching mechanisms can be used in case of link failures. Information for network management is transmitted using network management control messages, which have the highest priority on the network.

In some embodiments of the present invention, data packets can be transported using protocols such as Resilient Packet Ring (RPR) to provide resiliency, efficiency for packet data transport across hybrid physical medium. For example, multiple-medium network node can enable RPR protocols in packet transport. Packets would be encapsulated using RPR to enable fairness, reliability, efficiency, availability, statistical multiplexing, protection and quality of service (QoS).

In the various embodiments of this invention, novel structures, systems, and methods have been described to provide a multi-medium network node configured for use with both TDM data and packet data. By supporting multiple medium types such as optical, RF wireless, and free-space optical wireless, the present invention allows rapid deployment of the multi-medium network nodes as compared to conventional nodes require fiber optic links. Furthermore, by combining both TDM data and packet data into a TDM frame, the present invention provides packet data service over highly reliable TDM networks and increases the bandwidth utilization of TDM networks. The various embodiments of the structures and methods of this invention that are described above are illustrative only of the principles of this invention and are not intended to limit the scope of the invention to the particular embodiments described. For example, in view of this disclosure, those skilled in the art can define other network nodes, wireless interfaces, wireless links, dynamic multiplexers/demultiplexers, TDM framers/deframers, TDM frames, TDM switches, packet switches, user interfaces, network topologies, cross connect units, transceivers, physical layer interfaces, media abstraction layers, link quality management units, error correction code units, error correction codes, signal quality detectors, transmission power control unit, modulation control units, and so forth, and use these alternative features to create a method or system according to the principles of this invention. Thus, the invention is limited only by the following claims.

The invention claimed is:

1. A method of forming a digital or analog multiplexing data frame for providing to at least one network interface, the method comprising:
   determining an available bandwidth for a current digital or analog multiplexing data frame;
   selecting a digital or analog multiplexing bandwidth, wherein the digital or analog multiplexing bandwidth is greater than the available bandwidth;
   determining a part or whole payload size for the current digital or analog multiplexing data frame based at least in part on the available bandwidth; and
   creating the current digital or analog multiplexing data frame having a payload that is less than or equal to the part or whole payload size.

2. The method of claim 1, further comprising creating a header for the current digital or analog multiplexing data frame based on the digital or analog multiplexing bandwidth.

3. The method of claim 1, wherein the digital or analog multiplexing bandwidth is an integer multiple of a base bandwidth.

4. The method of claim 3, wherein the base bandwidth is OC-1/STS-1.

5. The method of claim 3, wherein the available bandwidth is not an integer multiple of the base bandwidth.

6. The method of claim 1, wherein the creating the current digital or analog multiplexing data frame having a payload that is less than or equal to the part or whole payload size comprises:
    receiving a plurality of digital or analog multiplexing data columns;
    receiving a plurality of data packets;
    transforming a first subset of the data packets into one or more digital or analog multiplexing packet columns; and
    combining the digital or analog multiplexing packet columns with a first subset of the digital or analog multiplexing data columns to form the payload of the current digital or analog multiplexing data frame.

7. The method of claim 6, wherein the one or more digital or analog multiplexing packet columns include a high priority data packet and a low priority data packet.

8. The method of claim 6, wherein the receiving the plurality of digital or analog multiplexing data columns further comprises receiving an incoming digital or analog multiplexing data frame containing a second subset of digital or analog multiplexing data columns.

9. The method of claim 8, wherein the receiving the plurality of digital or analog multiplexing data columns further comprises receiving a third subset of digital or analog multiplexing data columns from a digital or analog multiplexing user interface.

10. The method of claim 1, wherein the at least one network interface comprises a multi-medium interface.

11. The method of claim 1, wherein the at least one network interface comprises a wireless interface.

12. The method of claim 1, wherein the at least one network interface comprises a wireless link.

13. The method of claim 12, wherein the wireless link includes a link quality management unit.

14. The method of claim 13, wherein the link quality management unit changes an available bandwidth of the wireless link.

15. The method of claim 1, further comprising configuring the at least one network interface.

16. The method of claim 1, wherein the at least one network interface comprises a plurality of multi-medium interfaces to allow a multi-medium network node to simultaneously communicate with more than two other network nodes.

17. The method of claim 15, wherein configuring the at least one network interface comprises configuring an RF wireless transceiver.

18. A method of transmitting digital or analog multiplexing data frames between a first network node and a second network node over a data link, the method comprising:
    determining an available bandwidth for a current digital or analog multiplexing data frame;
    selecting a digital or analog multiplexing bandwidth, wherein the digital or analog multiplexing bandwidth is greater than the available bandwidth;
    determining a part or whole payload size for the current digital or analog multiplexing data frame based on the available bandwidth;
    creating the current digital or analog multiplexing data frame having a payload that is less than or equal to the part or whole payload size; and
    transmitting the current digital or analog multiplexing data frame from the first network node to the second network node using timing based on the digital or analog multiplexing bandwidth.

19. The method of claim 18, further comprising padding the payload of the current digital or analog multiplexing data frame.

20. The method of claim 18, further comprising creating a header for the current digital or analog multiplexing data frame based on a predefined digital or analog multiplexing bandwidth and a predefined payload size.

21. The method of claim 20, wherein the predefined digital or analog multiplexing bandwidth is an integer multiple of a base bandwidth.

22. The method of claim 21, wherein the base bandwidth is OC-1/STS-1.

23. The method of claim 21, wherein the available bandwidth is not an integer multiple of the base bandwidth.

24. The method of claim 18, wherein the creating the current digital or analog multiplexing data frame having a payload that is less than or equal to the part or whole payload size comprises:
    receiving a plurality of digital or analog data columns;
    receiving a plurality of data packets;
    transforming a first subset of the data packets into one or more digital or analog multiplexing packet columns; and
    combining the one or more digital or analog multiplexing packet columns with a first subset of the digital or analog multiplexing data columns to form the payload of the current digital or analog multiplexing data frame.

25. The method of claim 24, wherein the one or more digital or analog multiplexing packet columns include a high priority data packet and a low priority data packet.

26. The method of claim 24, wherein the receiving the plurality of digital or analog multiplexing data columns further comprises receiving an incoming digital or analog multiplexing data frame containing a second subset of digital or analog multiplexing data columns.

27. The method of claim 26, wherein the receiving the plurality of digital or analog multiplexing data columns further comprises receiving a third subset of digital or analog multiplexing data columns from a digital or analog multiplexing user interface.

28. A method of forming a plurality of digital or analog multiplexing data frames for providing to at least one network interface, the method comprising:
    determining a first available bandwidth for a first digital or analog multiplexing data frame;
    selecting a first digital or analog multiplexing bandwidth, wherein the first digital or analog multiplexing bandwidth is greater than the first available bandwidth;
    determining a first part or whole payload size for a current digital or analog multiplexing data frame based on the first available bandwidth;
    creating the first digital or analog multiplexing data frame having a first payload that is less than or equal to the first part or whole payload size;
    determining a second available bandwidth for a second digital or analog multiplexing data frame;
    selecting a second digital or analog multiplexing bandwidth, wherein the second digital or analog multiplexing bandwidth is greater than the second available bandwidth; and
    determining a second part or whole payload size for a current digital or analog multiplexing data frame based on the second available bandwidth; and creating the second digital or analog multiplexing data frame having a second payload that is less than or equal to the second part or whole fractional payload size.

* * * * *

UNITED STATES PATENT AND TRADEMARK OFFICE
CERTIFICATE OF CORRECTION

| | | |
|---|---|---|
| PATENT NO. | : 8,503,457 B2 | Page 1 of 1 |
| APPLICATION NO. | : 12/014685 | |
| DATED | : August 6, 2013 | |
| INVENTOR(S) | : Kumar et al. | |

It is certified that error appears in the above-identified patent and that said Letters Patent is hereby corrected as shown below:

In the Claims

Claim 24, Column 20, Line 19, replace "analog data" with --analog multiplexing data--.

Claim 28, Column 20, Line 65, replace "whole fractional payload" with --whole payload--.

Signed and Sealed this
Twenty-fourth Day of June, 2014

Michelle K. Lee
*Deputy Director of the United States Patent and Trademark Office*